United States Patent [19]

Gillick et al.

[11] Patent Number: 4,837,831

[45] Date of Patent: Jun. 6, 1989

[54] METHOD FOR CREATING AND USING MULTIPLE-WORD SOUND MODELS IN SPEECH RECOGNITION

[75] Inventors: Laurence Gillick, Brookline; Paul G. Bamberg, Framingham; James K. Baker, West Newton; Robert S. Roth, Newtonville, all of Mass.

[73] Assignee: Dragon Systems, Inc., Newton, Mass.

[21] Appl. No.: 919,885

[22] Filed: Oct. 15, 1986

[51] Int. Cl.$^4$ .............................................. G10L 5/00
[52] U.S. Cl. ...................................... 381/43; 381/41; 381/42; 364/513.5
[58] Field of Search ........................... 381/42, 43, 41; 364/513.5

[56] References Cited

U.S. PATENT DOCUMENTS

| | | | |
|---|---|---|---|
| 4,181,813 | 1/1980 | Marley | 381/43 |
| 4,450,531 | 5/1984 | Kenyon et al. | 381/42 |
| 4,712,242 | 12/1987 | Rajasekaran et al. | 381/42 |
| 4,718,094 | 1/1988 | Bahl et al. | 381/43 |

OTHER PUBLICATIONS

"Organization of the Hearsay II Speech Understanding System", Lesser, Fennell, Erman, and Reddy, IEEE Trans. Acoust., Speech, Sig. Process., vol. ASSP-23, p. 11-24, Feb. 1975.

"Motivation and Overview of SPEECHLIS: An Experimental Prototype for Speech Research", Woods, IEEE Trans. Acoust., Speech, and Signal Process., vol. ASSP-23, pp. 2-10, Feb. 1975.

"The HWIM Speech Understanding System", Wolf and Woods, 1977 IEEE Internat. Conf., Record on Acoust., Speech, and Sig. Process., pp. 784-787, May 9-11, 1977.

"A Modified K-means Clustering Algorithm for Use in Isolated Word Recognition", Wilpon and Rabiner, IEEE Trans. on Acoust., Speech, and Sig. Process., vol. ASSP-33, Jun. 1985.

Primary Examiner—William M. Shoop, Jr.
Assistant Examiner—Brian Young
Attorney, Agent, or Firm—Edward W. Porter

[57] ABSTRACT

A first speech recognition method receives an acoustic description of an utterance to be recognized and scores a portion of that description against each of a plurality of cluster models representing similar sounds from different words. The resulting score for each cluster is used to calculate a word score for each word represented by that cluster. Preferably these word scores are used to prefilter vocabulary words, and the description of the utterance includes a succession of acoustic descriptions which are compared by linear time alignment against a succession of acoustic models. A second speech recognition method is also provided which matches an acoustic model with each of a succession of acoustic descriptions of an utterance to be recognized. Each of these models has a probability score for each vocabulary word. The probability scores for each word associated with the matching acoustic models are combined to form a total score for that word. The preferred speech recognition method calculates to separate word scores for each currently active vocabulary word from a common succession of sounds. Preferably the first scores is calculated by a time alignment method, while the second score is calculated by a time independent method. Preferably this calculation of two separate word scores is used in one of multiple word-selecting phase of a recognition process, such as in the prefiltering phase.

24 Claims, 17 Drawing Sheets

METHOD FOR CREATING AND USING MULTIPLE-WORD SOUND MODELS IN SPEECH RECOGNITION

FIELD OF THE INVENTION

The present invention relates to speech recognition, and, in particular, to methods of creating and using sound models against which utterances to be recognized are compared by speech recognition systems. More specifically, the invention relates to creating and using sound models which represent similar sounds occurring in more than one sound. The methods disclosed are of particular relevance to prefiltering, that is, the process of performing relatively rapid tests to reduce the number of vocabulary words which undergo a detailed comparison against the utterance to be recognized.

BACKGROUND OF THE INVENTION

There has long been a desire to have machines capable of responding to human speech, such as machines capable of obeying human commands and machines capable of transcribing human dictation. Such machines would greatly increase the speed and ease with which people communicate with computers and with which they record and organize their words and thoughts.

Due to recent advances in computer technology and speech recognition algorithms, speech recognition machines have begun to appear in the past several decades, and have become increasingly more powerful and less expensive. For example, the assignee of the present application has publicly demonstrated speech recognition software which runs on popular personal computers and which requires little extra hardware. This system is capable of providing speaker dependent, discrete word recognition for vocabularies of up to two thousand words at any one time, and many of its features are described in U.S. patent application Ser. No. 797,249, entitled "Speech Recognition Apparatus and Method", which is assigned to the assignee of the present application, and which is incorporated herein by reference.

A major problem in speech recognition is that of reducing the tremendous amount of computation such recognition requires, so that recognition can be performed in a reasonable time by relatively inexpensive computer hardware. Since many speech recognition systems operate by comparing a given spoken utterance against each work in its vocabulary, and since each such comparison can require thousands of computer instructions, the amount of computation required to recognize an utterance tends to grow in proportion to the vocabularly size. Thus the problem of making speech recognition computationally efficient is more difficult in systems designed to recognize the large vocabularies necessary to make speech recognition useful for the trascription of normal speech.

The prior art has developed a variety of methods to reduce the computational demands required by large vocabularly recognition. One such prior art technique is that of "pruning". Generally speaking, pruning involves reducing the number of cases which a program considers, by eliminating from further consideration those cases which, for one reason or another, do not appear to warrant further computation.

For example, the system described in the above mentioned application Ser. No. 797,249 produces a score for each word in its active vocabulary after comparing that word against each successive frame of an utterance. This score corresponds to the likelihood that the frames received so far correspond to the given word. If the score for a given word is worse than a certain threshold, that word is removed, or pruned, from the active vocabulary and future frames are no longer compared against it. This technique greatly improves the computational efficiency, since it rapidly reduces the number of words against which successive frames of an utterance to be recognized have to be compared.

The above mentioned application Ser. No. 797,249 also uses another form of pruning, called prefiltering, to reduce computation. This prefiltering runs a superficial recognition against an entire vocabulary to quickly select those words which appear similar enough to the utterance to be recognized to warrant a more detailed comparison with that utterance.

In addition to pruning and prefiltering, the prior art has used lexical retrieval to reduce the number of vocabularly words against which an utterance has to be compared. In lexical retrieval information from the utterance to be recognized generates a group of words against which recognition is to be performed, and this is done without making a superficial comparison against each vocabulary word, as is disclosed in the above mentioned application Ser. No. 797,249. For example, the HEARSAY speech recognition program developed at Carnegie-Mellon University in the early 1970's has acoustic models of most syllables which occur in English. When an utterance to be recognized was received, it was compared against these syllable models, producing a list of syllables considered likely to occur in the word to be recognized. Then words containing those syllables were then chosen for comparison against the utterance to be recognized.

Speech recognition programs written at Bolt, Beranek, and Newman, have performed lexical retrieval by mapping all vocabulary words onto a common tree, in which branches correspond to phonemes. The root of the tree is the start of the word. Its first branches represent all the different initial phonemes contained in the vocabularly words. The second level branches connected to a given first level branch represent all the second phonemes in the vocabularly words which folow the first phoneme represented by the given first level branch. This is continued for multiple levels, so that words which start with a similar string of phonemes share a common initial path in the tree. When a word to be recognized is received, its successive parts are compared with a set of phoneme models, and the scores resulting from those comparisons are used to select those parts of the tree which probably correspond to the word to be recognized. The vocabularly words associated with those parts of the tree are then compared in greater detail against the word to be recognized.

Another method of reducing the computation required for speech recognition involves using common models to represent similar sounds occurring in different words. This saves computation, since it allows one comparison between a portion of an utterance to be recognized and a given common model to replace multiple comparisons between that utterance portion and the plurality of common sounds represented by the given common model. This general method is used in both the HEARSAY and Bolt, Beranek, and Newman's lexical retrieval methods described above. The HEARSAY program used syllable models, and the BB&N program used phonemes, to represent common sounds occurring in more than one word.

One way of developing common models to represent similar sounds occurring in more than one word is that of clustering. A preferred form of clustering involves grouping together, and creating a common probabilistic model to represent, similar sound models. A form of such clustering is described in detail in U.S. patent application Ser. No. 862,275, entitled "A Method for Representing Word Models for Use In Speech Recognition", filed by Gillick et al. on May 12th, 1986, which application is assigned to the assignee of the present application, and is incorporated herein by reference. This application Ser. No. 862,275 discloses the derivation of word models comprised of a sequence of nodes, each of which is a spectral probability distribution model representing the sound occurring in corresponding portions of multiple utterance of a given word. The nodes from many words are then clustered, or divided, into groups of nodes that have similar probability distributions. A common probability distribution model is calculated to represent all the nodes placed in a given cluster, and then that cluster model is used in place of its corresponding nodes in all word models. This greatly reduces the amount of memory required to represent a large vocabulary, since a relatively small number of cluster models can be used to spell a large number of words.

Another form of clustering has been described in a paper entitled "Modified K-Means Clustering Algorithm for Use in Isolated Word Recognition", by Wilpon et al., published in IEEE TRANSACTIONS ON ACOUSTICS, SPEECH, and SIGNAL PROCESSING, Volume ASSP-33, NO. 3, June 1985. The clustering disclosed in this paper clustered together utterances of the same word made by different speakers, to produce a relatively small number of cluster models to represent all the different ways that a given word can be said by different people. The cluster models each contained a succession of sub-models representing the sound of the word at successive points in time.

Although the above described methods do reduce the computation required for speech recognition, there still is a need for further computation reductions if present day personal computers are to recognize large vocabularies, such as twenty-thousand words or more, without the addition of expensive computational hardware.

SUMMARY OF THE INVENTION

It is an object of the present invention to provide speech recognition methods capable of dealing with relatively large vocabularies in a computationally efficient manner.

It is a further object of the present invention to provide speech recognition methods capable of reducing the number of words which undergo an extensive acoustic match against the utterance to be recognized.

It is yet another object of the invention to provide computationally efficient prefiltering methods for use in speech recognition.

It is still another object of the invention to provide speech recognition methods which improve the chance of detecting the correct word without unduly increasing the amount of computation required.

According to one aspect of the present invention, a first prefiltering method for use in a speech recognition system is provided. This method comprises receiving an acoustic description of an utterance to be recognized, storing a vocabulary of words, and storing a plurality of probabilistic acoustic cluster models. The method further involves using individual cluster models to represent at least a part of each of a plurality of vocabulary words and comparing at least a portion of the acoustic description from the utterance to be recognized against each of the cluster models and producing a cluster likelihood score for each such comparison. The method then involves using the cluster likelihood score produced for each cluster model to calculate a prefilter score for words represented by that cluster model, and selecting a subset of the vocabulary words which is to undergo a more lengthy comparison against the utterance to be recognized based upon the prefilter scores associated with those vocabulary words.

In the preferred embodiment of this aspect of the invention, the acoustic description of the utterance to be recognized includes a succession of acoustic descriptions, representing a sequence of sounds associasted with that utterance. Individual cluster models each comprise a succession of probabilistic acoustic models, modeling a sequence of sounds associated with each of a plurality of words. A succession of the acoustic representations from the utterance to be recognized are compared against the succession of acoustic models associated with each cluster model to produce a cluster likelihood score for each such cluster. Preferably the cluster models are "wordstart" models, that is, models which normally represent the initial portion of vocabulary words. If this is the case, it is preferred that the likelihood score produced for a given wordstart cluster model is used as an initial prefiltering score for each of its corresponding words and that extra prefilter scoring steps be performed for each of those words. Preferably such extra steps include comparing acoustic models from portions of each such word after that represented by its wordstart model against acoustic descriptions from the utterance to be recognized. It is also preferred that vocabulary words having the worst scoring wordstart models be pruned from further consideration before performing extra prefilter scoring steps. Preferably the comparison between the succession of acoustic descriptions associated with the utterance to be recognized and the succession of acoustic models in such cluster model are performed using linear time alignment. It is also preferred that the acoustic description of the utterance to be recognized comprise a sequence of individual frames, each describing the utterance during a brief period of time, and that a series of smoothed frames, each derived from a weighted average of a plurality of individual frames, be used in the comparison against the cluster model.

According to another aspect of the present invention, a speech recognition method if provided which involves receiving an acoustic description of an utterance to be recognized. The description includes a succession of acoustic representations representing a sequence of sounds associated with the utterance. The method further includes storing vocabulary words, storing a plurality of sound-sequence models, and using individual soundsequence models to represent sound-sequences occurring in more than one word. Each of these soundsequence models comprises a succession of probabilistic acoustic models which model a sequence of sounds. The method further involves using linear time alignment to compare a succession of acoustic representations from the utterance to be recognized against the succession of acoustic models of each of a plurality of sound-sequence models, and producing a sound-sequence score for each such comparison. Then the sound-sequence score produced for a given sound-sequence model is used to calculate a word score for each word associated with that model.

In a preferred embodiment of the invention, the sound-sequence models correspond to the cluster models described above and the word scores calculated with the sound-sequence scores are used as prefilter scores in the manner described above.

According to another aspect of the present invention, a method is provided for making acoustic models for use in representing vocabulary words. This method comprises deriving an acoustic description of each such vocabulary word, each of which descriptions comprises a succession of acoustic description which represent a sequence of sounds associated with its word. Then the method involves clustering the acoustic descriptions of the vocabulary words to derive a plurality of clusters. A multi-word cluster model is calculated for each of these clusters, each such model comprising a succession of acoustic models derived from the corresponding succession of acoustic descriptions of the words grouped in its cluster.

Preferably this clustering includes the following: clustering the acoustic descriptions of vocabulary words to derive a plurality of multi-word cluster models, each of which has a succession of cluster portions corresponding to the succession of acoustic descriptions associated with the words from which it was formed. Then, the cluster portions from a plurality of multi-word cluster models are themselves clustered to derive a plurality of cluster-portion cluster models. Finally, a record is made of which multi-word clusters have had their cluster portions placed in which cluster-poriton cluster models.

Preferably the method further includes deriving for each vocabulary word additional acoustic representations which represent the sounds of that word occur after the sounds represented by its associated wordstart cluster. Then these additional acoustic representations are clustered to form additional-representation cluster models, and finally each vocabulary word has associated with it not only its corresponding wordstart model, but also one or more additional-representation cluster models into which that words's one or more additional acoustic representations have been clustered.

According to another aspect of the invention a second speech recognition method matches an acoustic model with each of a succession of acoustic descriptions of an utterance to be recognized. Each of these models has a probability score for each vocabulary word. The probability scores for each word associated with the matching acoustic models are combined to form a total score for that word. Preferably this method is used for prefiltering, and the word scores are independent of the order of the acoustic descriptions.

According to yet another aspect of the present invention a speech recognition method calculates two separate word scores for each currently active vocabulary word from a common succession of sounds from the utterance to be recognized. Preferably the first scores are calculated by an embodiment of the above described first prefiltering method which uses time alignment, and the second scores are calculated by an embodiment of the above described second speech recognition method in which the score associated with each word is independent of the order of the sounds used to calculate that score. Preferably this calculation of two separate word scores is used in one of several word-selecting phases of a recognition process, such as in the prefiltering phase.

DESCRIPTION OF THE DRAWINGS

These and other aspects of the present invention will become more evident upon reading the following description of the preferred embodiment in conjunction with the accompanying drawings, in which.

DETAILED DESCRIPTION OF PREFERRED EMBODIMENTS

Figure 13:
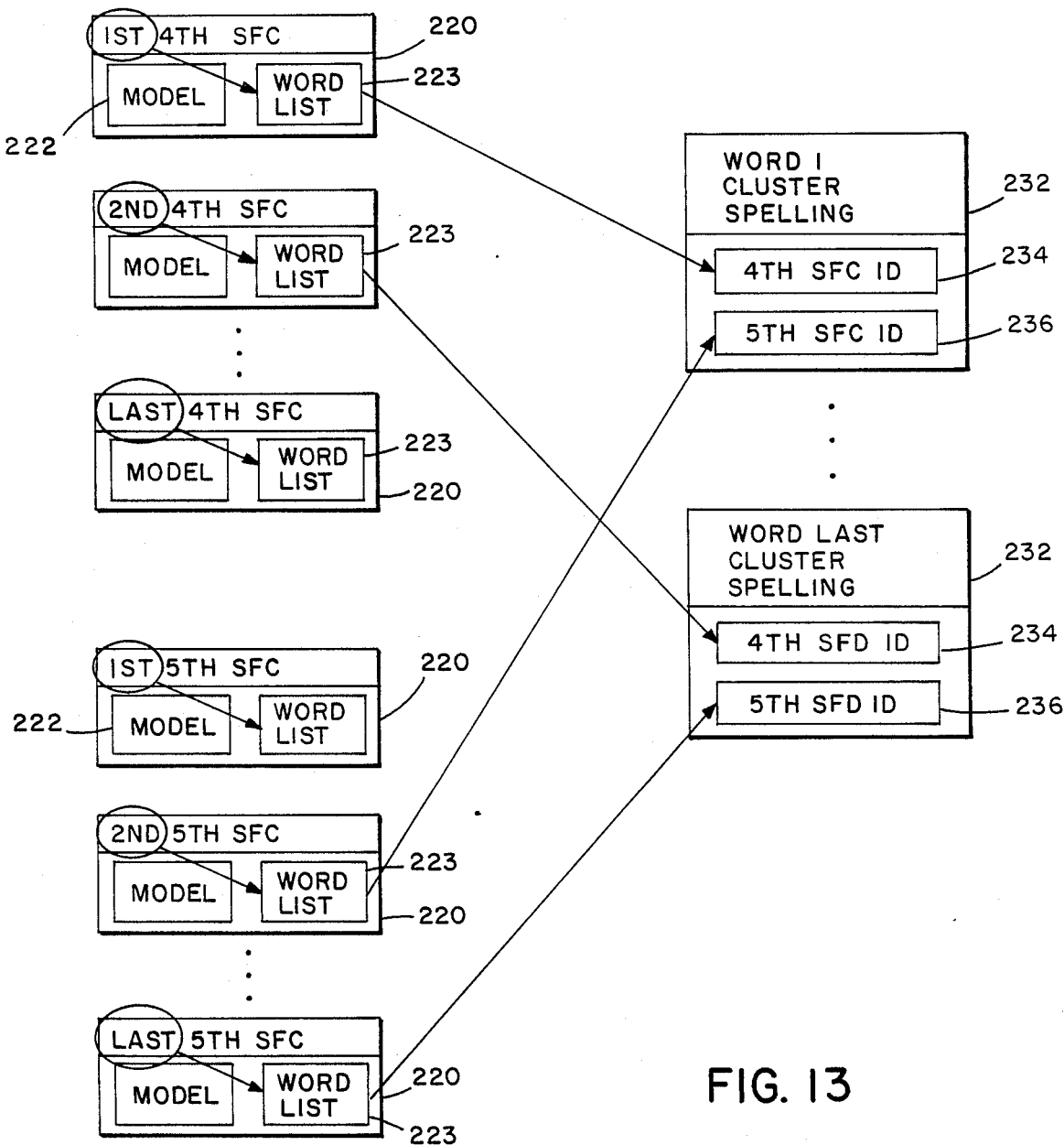
FIG. 13 is a schematic representation of how partial cluster spellings are made for each vocabulary word.
Figure 14:
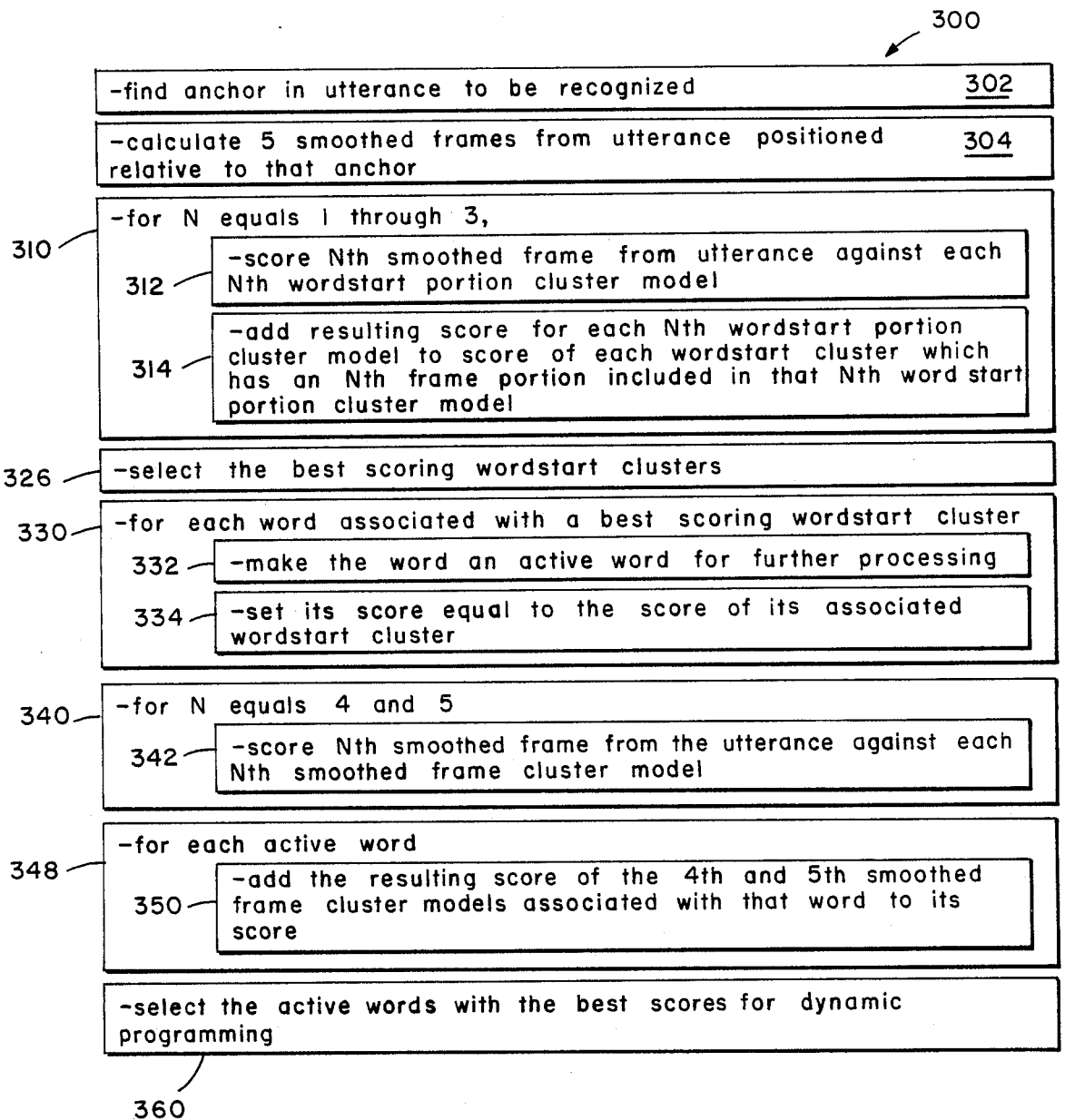
FIG. 14 is a schematic block diagram illustrating the computational steps used to perform the word recognition prefiltering process of the present invention.
Figure 15:
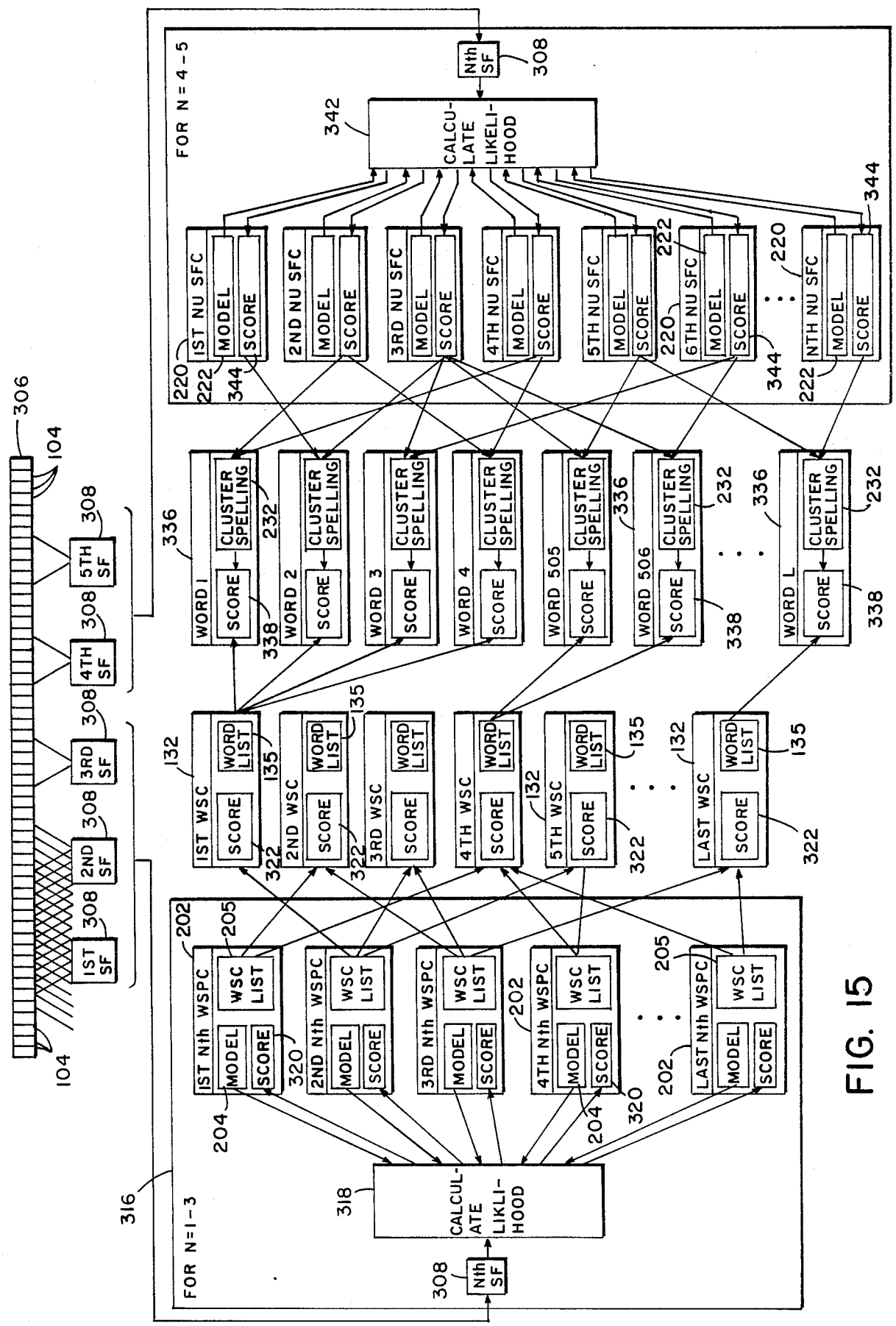
FIG. 15 is a schematic diagram used to illustrate the prefiltering speps described in FIG. 14.

The preferred embodiments of the present invention described in this specification include methods for preparing prefiltering models, and methods for using those models to prefilter the vocabulary used in a speech recognition process. By prefilter, we mean comparing the utterance to be recognized against acoustic models of vocabulary words to select a sub-vocabulary of those words considered most likely to match the utterance. Any of a variety of known speech recognition techniques, such as the dynamic programming process described in the above mentioned patent application Ser. No. 797,249, can then be use to select which of the resulting sub-vocabulary words most likely corresponds to the utterance to be recognized. FIGS. 1 through 13 disclose the steps involved in making prefiltering models according to a first preferred embodiment of the present invention. These steps are performed before the recognition process. FIGS. 14 and 15, on the other hand, describe the prefiltering process which uses these models. This process is used during recognition itself.

Figure 1:
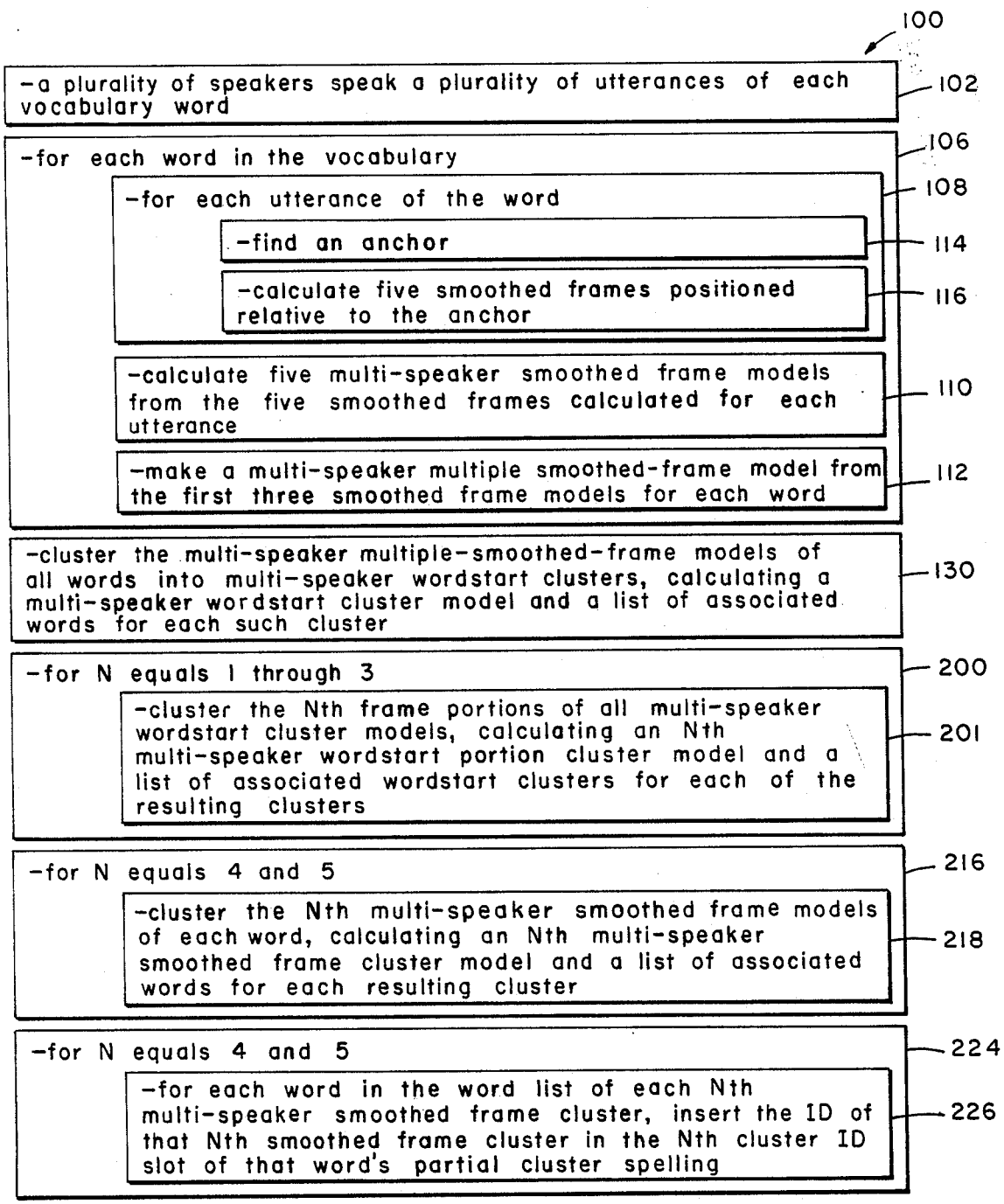
FIG. 1 is a schematic block diagram of the functional steps required to produce prefiltering models according to a first preferred embodiment of the present invention.

FIG. 1 represents the basic method 100 which is used to prepare the prefiltering models according to the first preferred embodiment of the invention. The first step of this method is the step 102. It involves having the system's user say a plurality of utterances of each word in a vocabulary which a given speech recognition system is to recognize. This is represented schematically in FIG. 2, which, for purposes of simplicity, show a speaker saying four utterances, U1 through U4, of each of two words, W1 and W2. Preferably the user should say five or more utterances of each word and the system vocabulary includes more than five thousand words. It is preferred to have the user say multiple utterances of each word in step 102 so that the prefilter models created by the program 100 will be general in nature, and thus will work reasonably well for the different ways in which the user says each of the vocabulary words.

Figure 2:
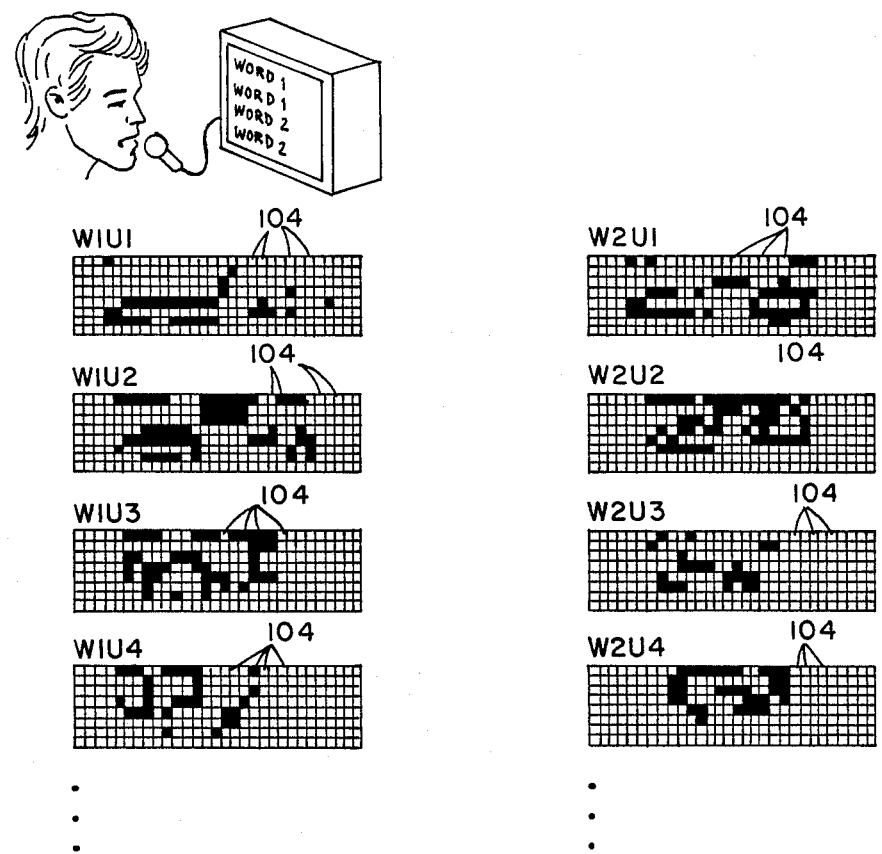
FIG. 2 is a schematic representation of a speaker saying multiple utterances of each of a plurality of words.
Figure 3:
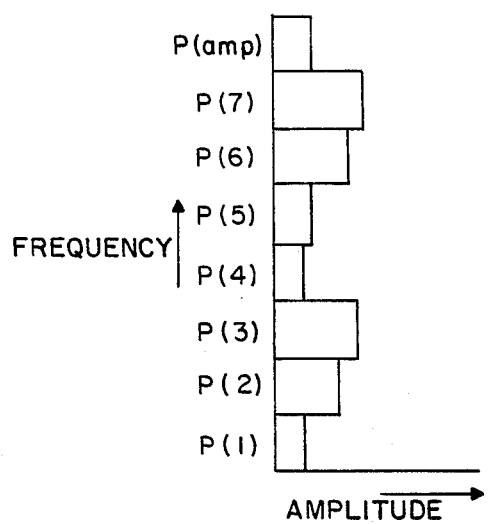
FIG. 3 is a graphical representation of a individual frame taken from a sequence of frames produced by an utterance of a word, such as one of those utterances shown in FIG. 2.

As is shown in FIG. 2, each of the utterances spoken in the step 102 are recorded as a sequence of acoustic frames 104. As is shown in FIG. 3, each of these frames is comprised of eight parameters P(1) through P(AMP). These frames and the methods of converting an utterance into them are described in much greater detail in the above-mentioned U.S. Pat. Application Ser. No. 797,249. Basically these frames are produced once every 50th of a second and they represent the energy of sound occurring during their corresponding period of time in each of eight spectral frequency bands. The first seven parameters of each frame, parameters P(1)–P(7), represent the logarithm of the energy in their associated frequency band. The eighth parameer, P(AMP), corresponds to the logarithm of the total energy contained in all eight frequency bands used to calculate each frame.

Once step 102 has obtained multiple utterances of each vocabulary word, method 100 advances to step 106. This step performs a plurality of substeps 108, 110, and 112 for each word in the vocabulary. The first of these substeps, step 108, itself comprises two substeps, 114 and 116, which are performed for each utterance of each word. Step 114 finds an anchor for each utterance, that is, the first location in the utterance at which it has attained a certain average threshold amplitude. Step 116 calculates five smoothed frames for each utterance, positioned relative to its anchor.

Figure 4:
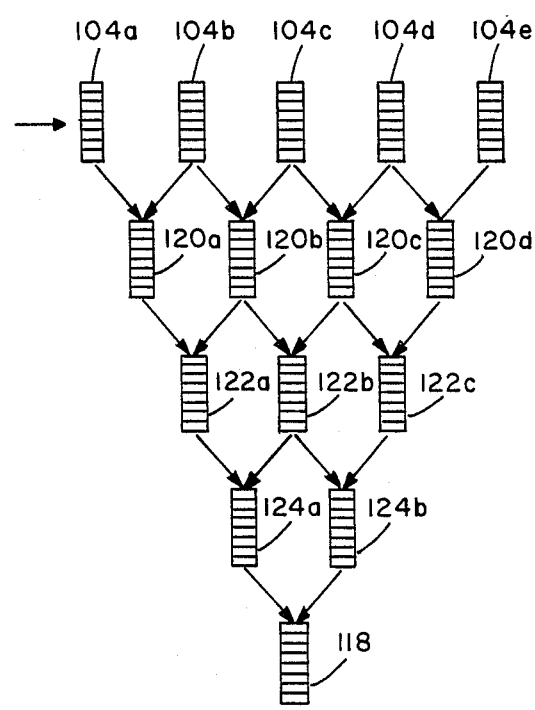
FIG. 4 is a schematic representation of the calculation of a smoothed frame.
Figure 5:
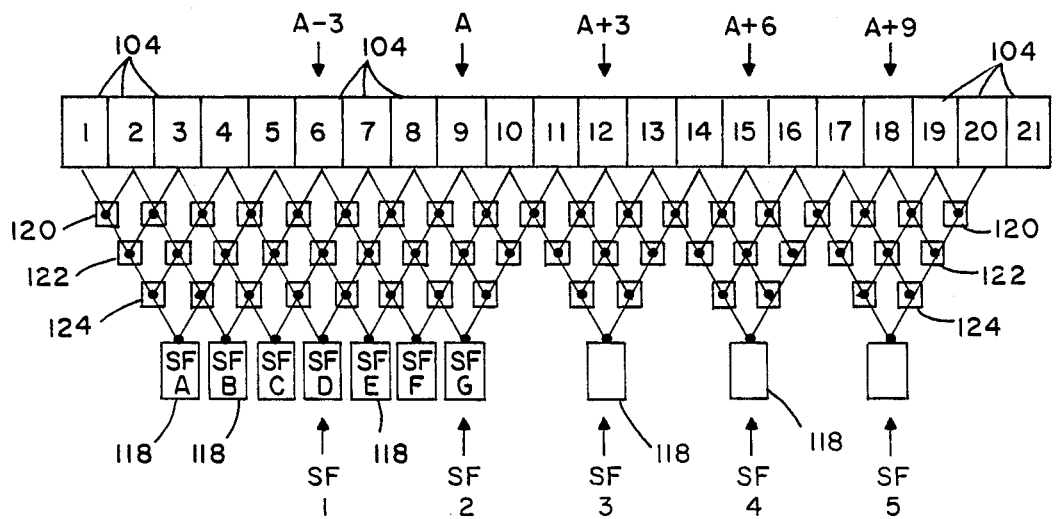
FIG. 5 is a schematic representation of how an anchor frame is selected for a given utterance and then how five smoothed frames are calculated for the utterance of positions fixed relative to the anchor frame.
Figure 6:
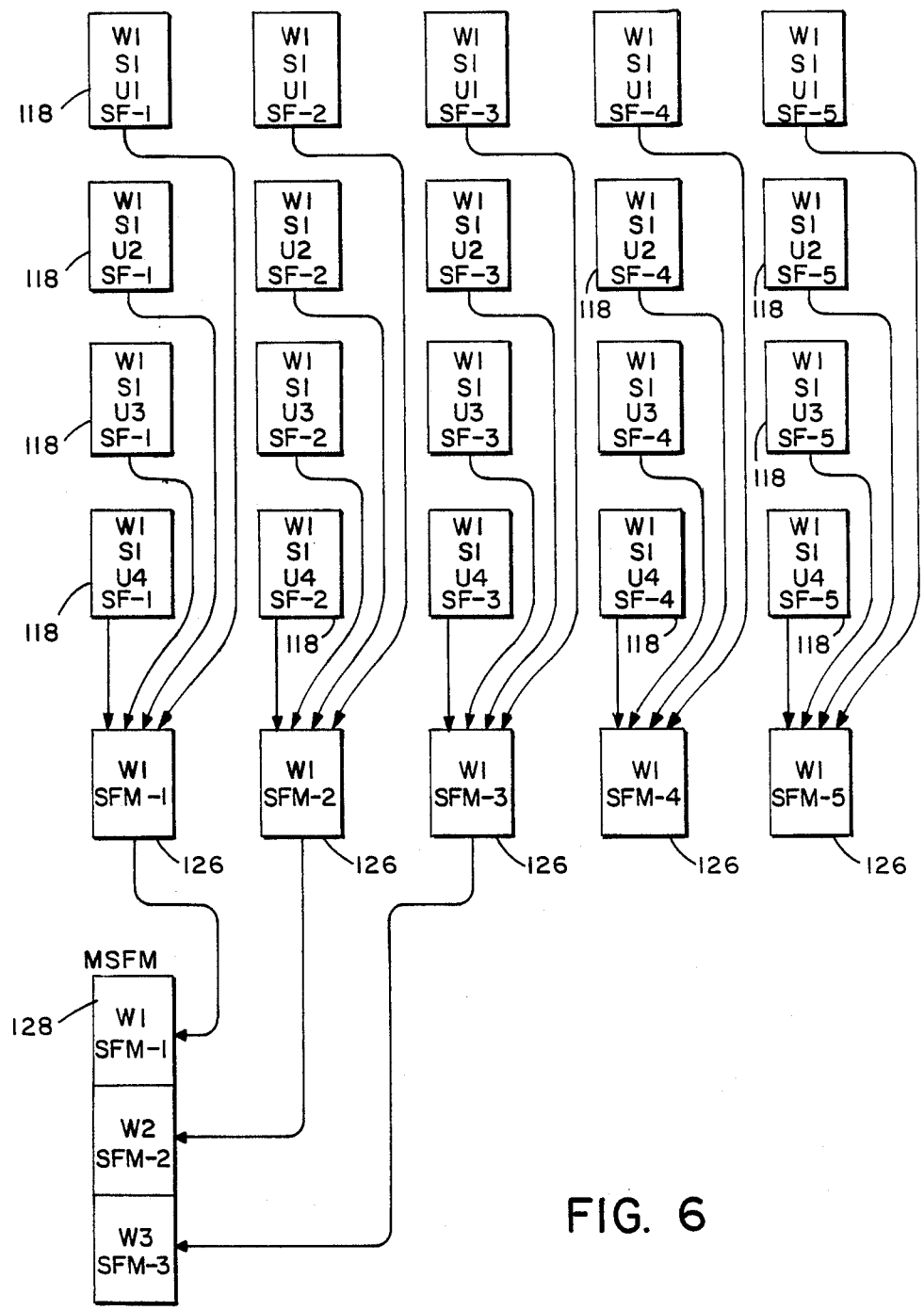
FIG. 6 is a schematic representation of how the smoothed frames calculated for different utterances of a given word are combined to form smoothed frame models, and how a group of these smoothed frame models are combined to form multiple-smoothed- frame models.
Figure 7:
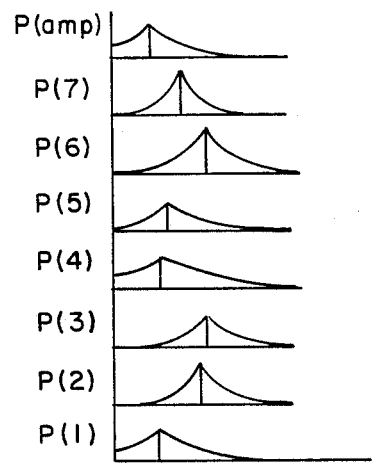
FIG. 7 is a schematic representation of an n-dimensional probability distribution of the type had by the smoothed frame models shown in FIG. 6.
Figure 8:
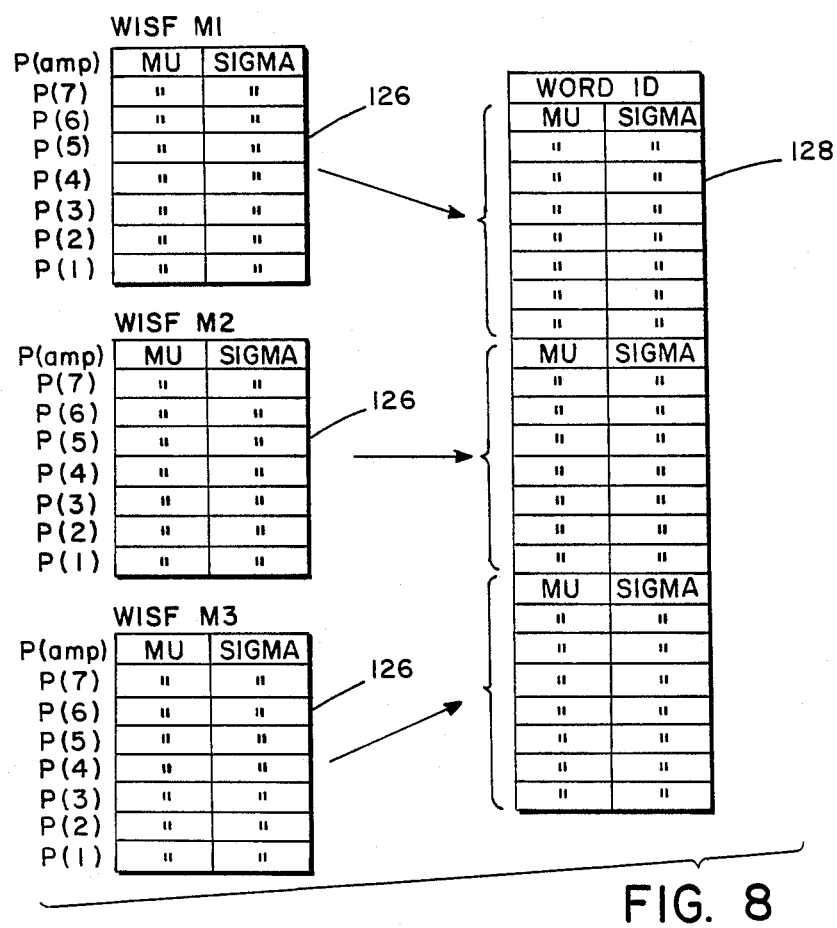
FIG. 8 is a schematic representation of the proces by which multiple-smoothed-frame models are created.

Referring now to FIGS. 4 and 5, the steps 114 and 116 of FIG. 1 will be described in greater detail. Both the steps 114 and 116 involve the calculation of smoothed frames. FIG. 4 schematically represents how such smoothed frames are calculated. In the first preferred embodiment, each smoothed frame 118 is calculated from five individual frames 104A–104E, of the type described above with regard to FIG. 3. According to this process, each pair of successive individual frames 104 are averaged, to form one second level frame 120. Thus the individual frames 104A and 104B are averaged to form the second level frame 120A, and the individual frames 104B and 104C are averaged to form the second level frame 120B, and so on, as is shown in FIG. 4. In this averaging process, each parameter of an individual frame is averaged with its corresponding parameter in the individual frame with which it is averaged. Thus the resulting second level frame is made up of eight parameters, each of which is the average of its corresponding parameters in the two individual frames from which it is calculated.

Once four second level frames 120A through 120D have been calculated, each pair of successive second level frames is averaged together to form three third level frames 122A through 122C. The averaging process used to form these third level frames is indentical to that used to form the second level frames. Once the three third level frames have been formed, each pair of successive third level frames are then averaged in the same manner to form two fourth level frames 124A and 124B. Then these two fourth level frames are averaged in the same manner to form the smoothed frame 118. As a result, each of the eight parameters of the smoothed frame 118 has a value which corresponds to a weighted average of the corresponding parameters in each of the five individual frames 104A through 104E. As those skilled in the mathematical arts will appreciate, the individual frames 104B and 104D contribute four times as much to the weighted average of the parameters of the smoothed frame 118 as do the individual frames 104A and 104E, and the central individual frame 104C contributes six times as much to those weighted averages as to the outer most individual frames 104A and 104E. As those skilled in the mathematical arts will recognize, the weighting coefficients, 1,4,6,4,1 used to weight the input of five individual frames to their corresponding smoothed frame are binomial coefficients. Thus it can be seen that each smoothed frame 118 represenmts the sound over a portion of five individual frames from which it is calculated, but that it represents most closely the sound occurring at the center of those five frames.

Step 114 of FIG. 1 seeks to find an anchor for each utterance of each word. It does this by receiving a sequence of frames 104 for each utterance, as is shown in FIG. 5, and by calculating a smoothed frame for each group of five successive frames contained in that sequence until an anchor is found. Thus, as is shown in FIG. 5, it calculates the smoothed frame labeled SF-A for the individual frames 104 labeled 1–5, the smoothed frame SF-B for the individual frames 2–6, the smoothed frame SF-C for the individual frames 3–7, and so forth. As each such, smoothed frame is calculated, its amplitude, that is its parameter P(AMP), is compared against a threshold value, which is preferably an amplitude value approximately halfway between the normal amplitude of background sound, in which no speech is occurring, and the normal amplitude of a stressed vowel. The first smoothed frame which has an amplitude equal to, or greater than, this threshold is selected as the anchor smoothed frame. In FIG. 5, it is assumed that the smoothed frame labeled SF-G is the first frame to match or exceed this threshold, and thus its corresponding individual frame 104, that labeled 9, is chosen as the anchor individual frame.

Once step 114 has been completed, and an utterance's anchor has been found, step 116 is performed for the utterance. This involves calculating five complete smoothed frames, each with eight parameters, for the initial portion of the utterance. In the first preferred embodiment, these five smoothed frames are centered around individual frames 104 which are separated from each other by three individual frames, with the first of the five smoothed frames being centered around the individual frame located three frames before the anchor individual frame. As is shown in FIG. 5, the five smoothed frames SF-1, SF-2, SF-3, SF-4, and SF-5 are centered around the individual frames labeled 6, 9, 12, 15, and 18, respectively.

It can be seen that steps 114 and 116 provide a relatively compact representation of the start of each utterance. Using smoothed frames, rather than just selecting every third individual frame 104, causes the utterance-start representations to be less affected by noise and short-term variations in the utterance. Picking the smoothed frames relative to an anchor causes representations of the start of different utterances of the same word to be better aligned, since it causes each of those representations to be positioned relative to the first relatively loud, and thus relatively reliable, sound in that word. The use of smoothed frames in picking the anchor reduces the chance that anchor position will be altered by noise or short term fluctuations in speech sounds.

Once an anchor and five smoothed frames have been calculated for each utterance of a word, the program of FIG. 1 advances to step 110. Step 110 calculated five smoothed frame models 126 for each word from the five smoothed frames 118 calculated for each utterance of that word. This process is represented in the upper part of FIG. 6, which shows each of the correspondingly numbered smoothed frames 118, SF-1 through SF-5, from each of four utterances, U1–U4, of the first word, W1, being combined. The correspondingly numbered smoothed frames 118 from the multiple utterances of a given word are used to calculate a correspondingly numbered smoothed frame model 126, SFM-1 through SMF-5. Each of these smoothed frame models 126 is an eight dimensioned probability distribution, as is represented graphically in FIG. 7. Such eight dimensional probability distributions are described in much greater detail in the above mentioned U.S. patent application Ser. No. 797,249. Each dimension of such a probability distributions has a mu, or average value, and a sigma, or measure of deviation. The mu and sigma of each dimension, or parameter, of a smoothed frame model are calculated by standard statistical techniques from corresponding parameters in the correspondingly numbered smoothed frames 118 of the multiple utterances of its associated word.

Once each of five smoothed frame models 126 have been calculated for a given word, the program advances to step 112 shown in FIG. 1, which involves making, for each word, a multiple-smoothed-frame model 128 from the first three smoothed frame models for that word. This is illustrated in the bottom portion of FIG. 6 and also in FIG. 8. This merely involves concatenating the mu and sigma values recorded for the eight parameters of each of the first three smoothed frame models for a given word, as is shown in detail in FIG. 8.

As is stated above, steps 108, 110 and 112 are performed for each word in the vocabulary. Once these steps have been completed, each word as associated with it five probabilistic smoothed frame models 126 and a multiple-smoothed-frame model 128 comprised of the word's first three smoothed frame models.

Once these steps have been executed, the program advances to step 130 shown in FIG. 1. Step 130 involves clustering the multiple-smoothed-frame models from all vocabulary words into a plurality of "wordstart" clusters 132, and calculating a cluster model 134 and a word list 135 for each such cluster. This process is shown in greater detail in FIG. 9 and FIG. 10.

Figure 9:
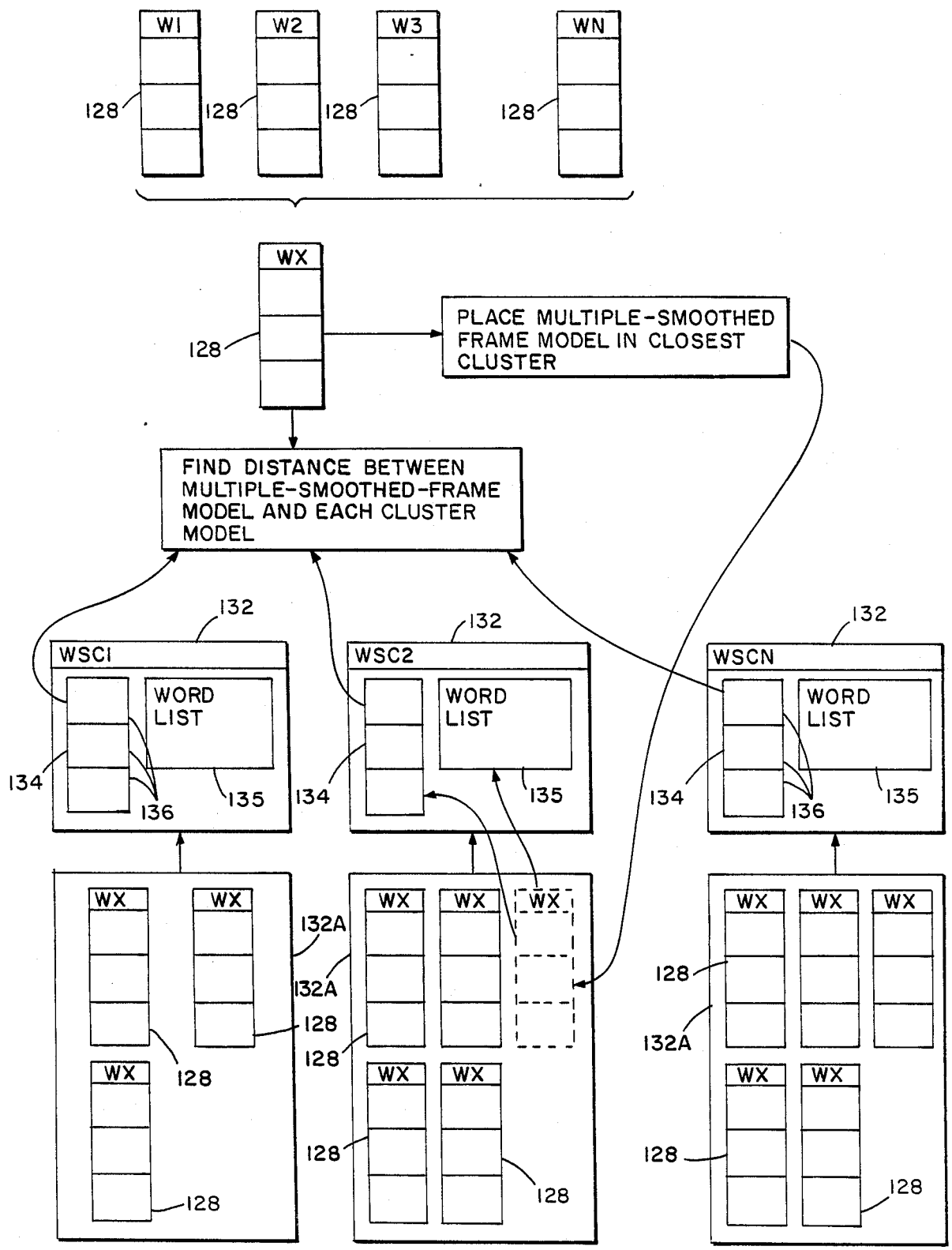
FIG. 9 is a schematic representation of a clustering process in which the multiple-smoothed-frame models of the type shown in FIG. 6 and FIG. 8 are grouped into wordstart clusters.

In this specification and the claims that follow, when we use the word "cluster" we refer to a process by which a set of probabilistic models, such as the multiple-smoothed-frame models 128 of FIG. 9, are divided into subgroups, or clusters, of relatively similar models. More specifically, it involves the clustering of acoustic probability distribution models so that distribution models which have a similar likelihood of generating a given acoustic description are grouped together.

Figure 10:
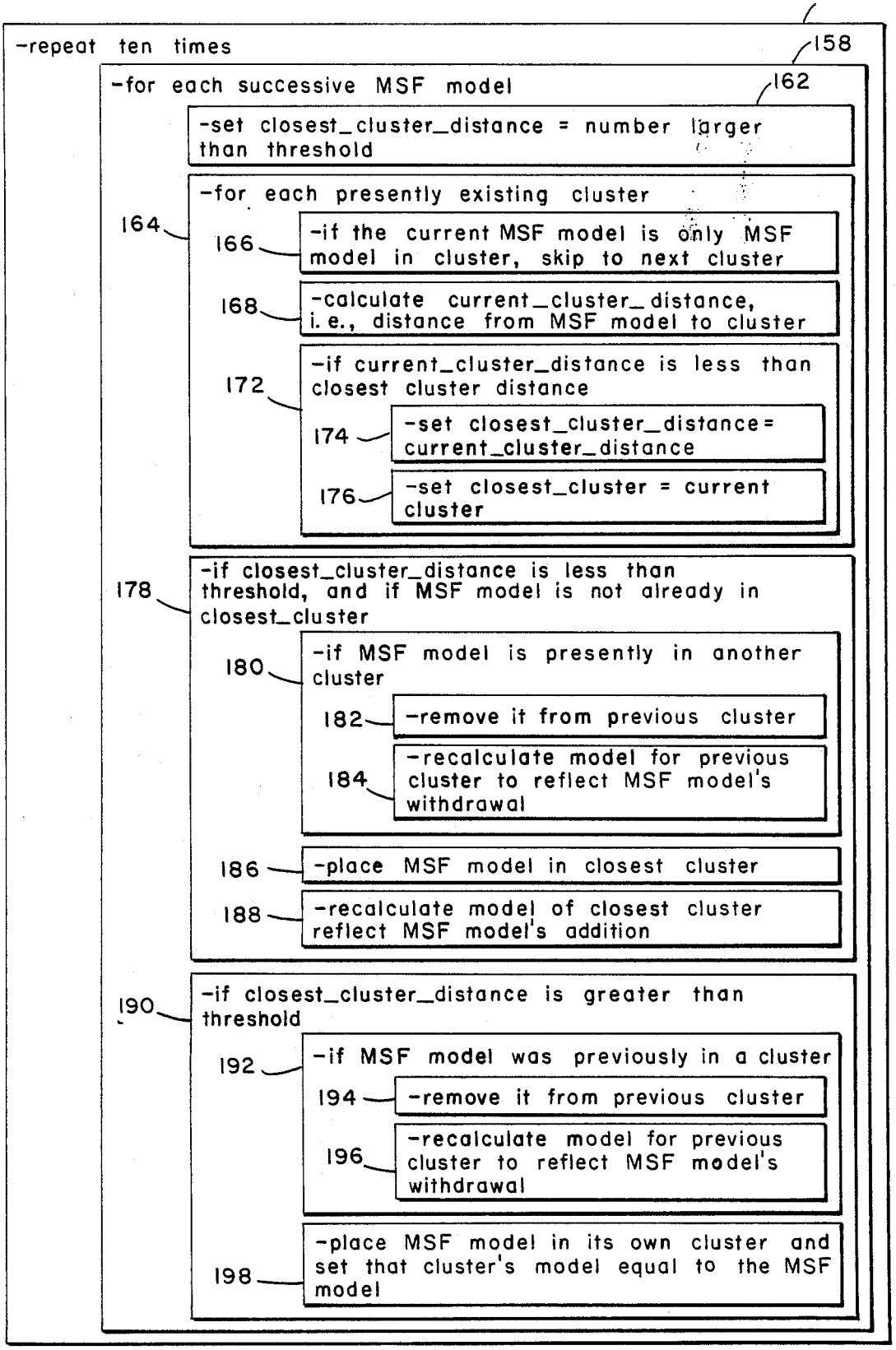
FIG. 10 is a schematic block diagram illustrating the steps used to perform the clustering illustrated schematically in FIG. 9.

Referring now to FIGS. 9 and 10, the multiple-smoothed-frame models 128 ("MSF models") are divided by use of a clustering algorithm into a plurality of clusters, or groupings, 132 of similar MSF models. For purposes of illustration, these clusters are represented in FIG. 9. by the groupings 132A of MSF models. In actuality, a given cluster 132 does not contain a copy of each MSF model placed within it, but rather a cluster probability distribution model 134, calculated from the probability distribution of each MSF model placed within the cluster, and a word list 135 identifying all the word's whose MSF models have been placed within the cluster.

The clusters 132 are called "wordstart" clusters, because, they often model only the starting sounds of words. In the first preferred embodiment the three smoothed frame portions of a wordstart model represent sound from about eleven individual frames 104. Since fifty individual frames are made per second of speech, the wordstart model represents about a fifth of a second of speech, which is sufficiently short that it will only represent the initial portion of most words. Each of the wordstart clusters 132, WSC1, WSC2, WSC3,...llWSCN, have associated with them a cluster model 134 and a word list 135. Each cluster model 134 is a twenty-four dimensional probability distribution corresponding in form to the twenty-four dimensional probability distribution of each of the MSF models 128.

As is illustrated by the flow chart of FIG. 10, the clustering algorithm of step 130 consists of a sequence of steps 156. This sequence 156 repeatedly executes a sub-sequence of steps 158, each execution of which performs a single pass of a clustering algorithm. In the first preferred embodiment, the sub-sequence 158 is repeated ten times, so that ten passes of the clustering algorithm are made. It has been found experimentally that ten passes are usually enough to let the clustering algorithm substantially converge into a somewhat optimal division of the multiple-smoothed-frame models 128.

Each pass 158 of the clustering algorithm includes performing a sequence of sub-steps 162, 164, 178 and 190 for each MSF model to be clustered. The first of these steps, step 162, sets the variable closest_cluster_distance equal to a number larger than the clustering threshold used in step 178, described below.

After step 162 has been performed, the algorithm advances to the steps in block 164. Block 164 is comprised of a sequence of steps 166, 168, and 174, which are performed for each presently existing cluster.

The first of these steps in step 166. It tests to see if the current MSF model for which the steps 162, 164, 178, and 190 are being performed is the only MSF model in the current cluster for which the steps of block 164 are being performed. If so, the current cluster is what is known as a singleton cluster, that is, a cluster with only one MSF model in it. On the first pass of the clustering algorithm this test will never be met, because the current MSF model will not have yet been placed in a cluster. But in successive passes the test may be met, because the current MSF model will have been placed in a cluster by the previous pass.

If the current MSF model is the only MSF model in the current cluster, step 166 instructs the algorithm to terminate performing the steps of block 164 for the current cluster and to advance to performing those steps for the next cluster. Without steps 166, the MSF model of a singleton cluster would always be reclustered into the same singleton cluster. This is because the cluster model of a singleton cluster has exactly the same probability distribution as the MSF model whic is in it, and thus, the clustering algorithm would always find the singleton cluster to be the closest cluster to an MSF model placed within it. The purpose of this clustering, however, is to group together similar MSF models. Thus it is desirable to group an MSF model from singleton clusters into another cluster, unless the distance between that model and all other clusters is greater than the clustering threshold. Step 190, described below, insures that an MSF model remains a singleton cluster if, in fact, it is further than the clustering threshold distance from any other cluster.

If the current MSF model is not the only model in the current cluster, the algorithm advances to step 168. In this step a distance is calculated from the current MSF model to the model of the current cluster. As is illustrated in FIG. 9, each cluster 132 has associated with it a cluster model 134. The mu's and sigma of each dimension of the cluster model are calculated according to the following formulas:

$$mu_c = \frac{sum(mu_i)}{N_c}$$

$$sigma_c = \frac{sum(sigma_i)}{N_c}$$

Where $mu_c$ and $sigma_c$ are the mu and sigma of the cluster model of cluster c for a given parameter, where $n_c$ is the number of MFS models assigned to the cluster c, where "sum" means the sum over all of $N_c$ MSF models assigned to the cluster c, and where it is assumed that there are the same number of training utterances of each word.

It will be appreciated by those skilled in the mathematical arts that the value of mu calculated for the cluster model for a given dimension of its probability distribution will equal the average of its corresponding parameter value over all smoothed frames 118 used to calculate that parameter in the MSF model placed in that cluster model. It will also be understood by those skilled in the mathematical arts, however, that the value of the sigma calculated for a given dimension of the cluster model will not be exactly equal to the sigma of its corresponding parameter value over all smoothed frames 118 used to calculate that parameter in the MSF models from which the cluster model is derived. This is because when one averages together sigma's taken relative to different mu's the resulting average does not equal the sigma of the data from which the average sigma's were themselves derived. Experimental results, however, indicate that this difference often does not significantly affect the quality of the clustering produced by the algorithm 156. If, however, it is desired to obtain more accurate sigmas for a cluster model 134, they can be calculated for each parameter by computing such sigmas directly form all of the corresponding smoothed frames 118 from which the MSF models placed in the given cluster are derived.

Each cluster model 134, has 24 dimensions corresponding to the twenty-four dimensions of each MSF model. The first eight of the cluster models dimensions are derived form the first smoothed frame model of each of that cluster's corresponding MSF models, and thus is called a first smoothed frame portion. For similar reasons the second and third eight dimensions of the cluster model are called second and third smoothed frame portions, respectively. These first, second, and third frame portions are labeled with the number 136 in FIG. 9.

Once cluster models have been calculated, the distance between each MSF model and each cluster model is calculated using a distance measure based on the expectation of the disparity between the likelihood scores which the MSF model and the cluster model would assign to a distribution of vectors. These vectors, referred to as multiple-smoothed-frame, or MSF, vectors, have one parameter for each dimension of the MSF and cluster models. In the embodiment of the invention being described, these MSF vectors each correspond to the first three smoothed frames of an utterance, and they each have twenty-four parameters, eight for each of those three smoothed frames.

In the preferred embodiment being described, this measure is based on the Kullback-Leibler information, which has the following form:

$$K(f_n, f_c) = E_n(\log\{f_n(x)/f_c(x)\})$$

where $E_n$ is the expected value of the expression which follows it integrated over the probability distribution $f_n$; where $f_n$ is the twenty-four dimensional probability distrubition of the MSF model; where $f_c$ is the twenty-four dimensional probability distribution of the cluster model; where $f_n(x)$ is the likelihood that a given MSF vector x would be generated according to the MSF model $f_n$; and where $f_c(x)$ is the likelihood that such a MSF vector x would be generated by the probability distribution $f_c$ of the current cluster model.

This Kullback-Leibler information measure is referred to as measuring the "distance" between a given model and a given cluster. The words "measure" and "distance" are used herein to provide a relatively easy to understand, and a generally intuitively correct, description of the measurement used in clustering. It will be understood, however, by those skilled in the mathematical arts that the Kullback-Leibler formula provides a measure of disparity between two probability distributions, not a distance in the strict sense of that term. Therefore, when reading this application, please appreciate that the word "measure" refers to such a measure of disparity, and that the "distance" between a model and a cluster refers to the disparity between their probability distributions.

After the distance between the current MSF model and current cluster model have been calculated in step 168, the program of FIG. 10 advances to step 172. There a test is made to see whether this distance is less than closest_cluster_distance, the shortest distance between the current model and any cluster calculated previously during the current pass 158. If the just calculated distance is less than the shortest previously calculated distance, the two steps 174 and 176 shown in the block 172 are performed, otherwise they are not. In the first of these two steps, step 174, the value of the variable closest_cluster_distance is set equal to the distance between the current MSF model and the current cluster. In the second, step 176, the variable closest_cluster is set equal to the number of the current cluster, so the program can keep track of which cluster is currently considered closest to the current MSF model.

After the steps within block 172 are completed for the last presently existing cluster, the steps of block 164 are complete for the current MSF model, and the processing of the current MSF model advancese to the group of instructions contained in the block 178 of FIG. 10. These instructions start out with a test to see if both a) the variable closest_cluster_distance is less than the clustering threshold and b) the current model is not already in the cluster indicated by the variable closest_cluster. If both these tests are met, the steps 180, 186, and 88 are all carried out for the current MSF model, otherwise the program immediately skips to step 190.

If the program advances to step 180, another test is performed. This one checks to see if the current MSF model is presently in a cluster other than the closest cluster. If so, the steps 182 and 184 are carried out, otherwise the program immediately advances to step 186. This test is performed because during the first pass of the clustering algorithm the MSF model will not have been placed in any cluster by the time the program gets to step 180. But during subsequent passes, any time the program advances to step 180, the current MSF model will be in a cluster other than closest cluster. In this case the program removes the current MSF model from its previous cluster 132 in step 182. This involves removing its word ID, WX shown in FIG. 9, from the cluster's word list 135. Then step 184 recalculates the model 134 for that previous cluster to reflect the MSF model's withdrawal.

After completing the steps in bock 180 the program advances to step 186, in which it places the current MSF model in the closest cluster 132. This involves placing its word ID, WX shown in FIG. 9, in the word list 135 associated with that cluster. Then it advances to step 188, where it recalculates the model 134 of the closest cluster to reflect the MSF model's addition. At this point all of the steps of block 178 are completed for the current MSF model.

After completing the steps of block 178, the program advances to block 190. This block starts with a test to determine if the variable closest_cluster_distance is greater than the clustering threshold. If so, the steps 192 and 198 will be performed. Otherwise, the program skips to the end of the block 190, which is also the end of the block of steps 158 performed for each MSF model. The test at the start of block 190 can only be met if the test at the start of block 178 has failed. Thus, for a given MSF model in a give pass, the steps 192 and 198 are carried out only if the steps 180, 186, and 188 are not.

If closest_cluster_distance is greater than the clustering threshold, the program advances to step 192, where it performs a test to determine if the MSF model is in a cluster, as it will be in all but the first pass of the clustering algorithm. If the test is met, the MSF model is removed from that cluster in step 194, meaning that its corresponding word ID, WX shown in FIG. 9, is removed from the cluster's associated word list 135. Then, in step 196, the model 134 for the cluster is recalculated to reflect the MSF model's withdrawal. If the test is not met the program advances immediately to step 198. In step 198 the current MSF model is placed in its own cluster 132, which is given a cluster model having the same probability distribution as that MSF model 128, and which has an initial word list 135 containing that MSF model's word ID.

When the first pass of clustering algorithm 156 performs the steps of block 158 upon the first MSF model, there are no presently existing clusters. Thus the program skips the steps of block 164, because there are no clusters, and skips the steps of block 178, because there is no closest_cluster_distance less than the clustering threshold. Thus the program places the first MSF model in its own cluster in step 198.

When the first pass executes block 158 for the second MSF model, step 168 calculates the distance between the second MSF model and the cluster formed by the first MSF model. If that distance is less than the clustering threshold, block 178 places the second MSF model in the cluster previously formed by the first MSF cluster. Otherwise step 198 places the second MSF model in its own cluster. The first pass repeats this process for each MSF model, placing it in the cluster to which it is closest if its distance to that cluster is less than the clustering threshold, or placing it in its own cluster if the distance to the closest is above the clustering threshold.

In successive passes of the clustering algorithm each MSF model is already placed in a cluster. In such successive passes, each MSF model is compared to each currently existing cluster. The only exception is that indicated in step 166, in which the current MSF model is not compared with its own cluster if it is the only MSF model in that cluster. In such successive passes each MSF model is placed in the cluster to which it is closest unless its distance to the closest cluster is greater than the clustering threshold, in which case it is again placed in its own separate cluster.

As a general rule during each successive pass of the clustering, the number of MSF models which change clusters tends to decrease until a local optimum is achieved. However, some minor oscillation in the clustering populations may continue. Experiments have indicated that making ten clusteirng passes 158 is normally sufficient to obtain relatively optimal clustering.

Figure 11:
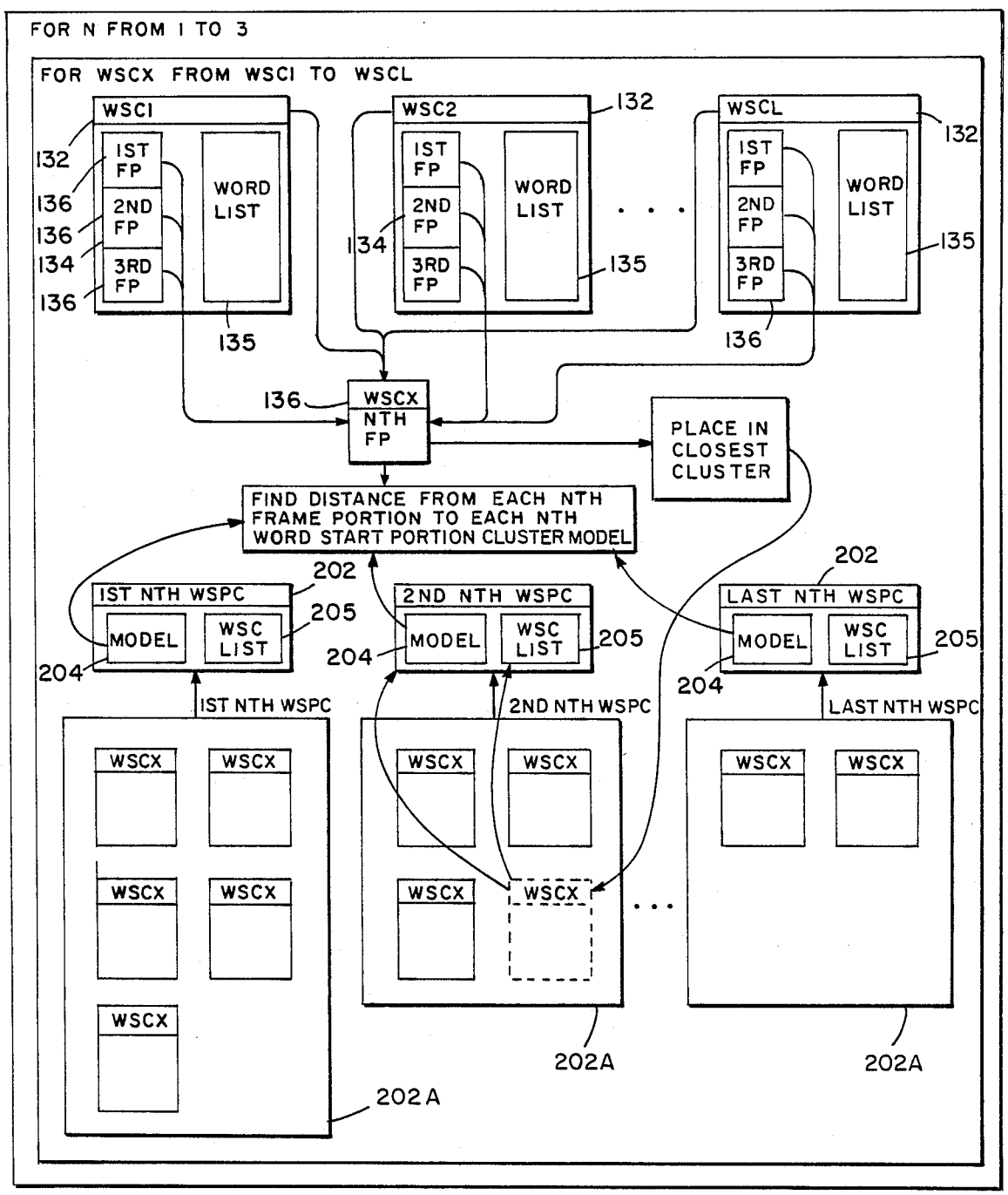
FIG. 11 is a schematic represenation of a clustering process in which the three smoothed frame portions of the wordstart cluster models produced by the process described with regard to FIG. 9 and FIG. 10 are themselves clustered to form wordstart-portion cluster models.
Figure 12:
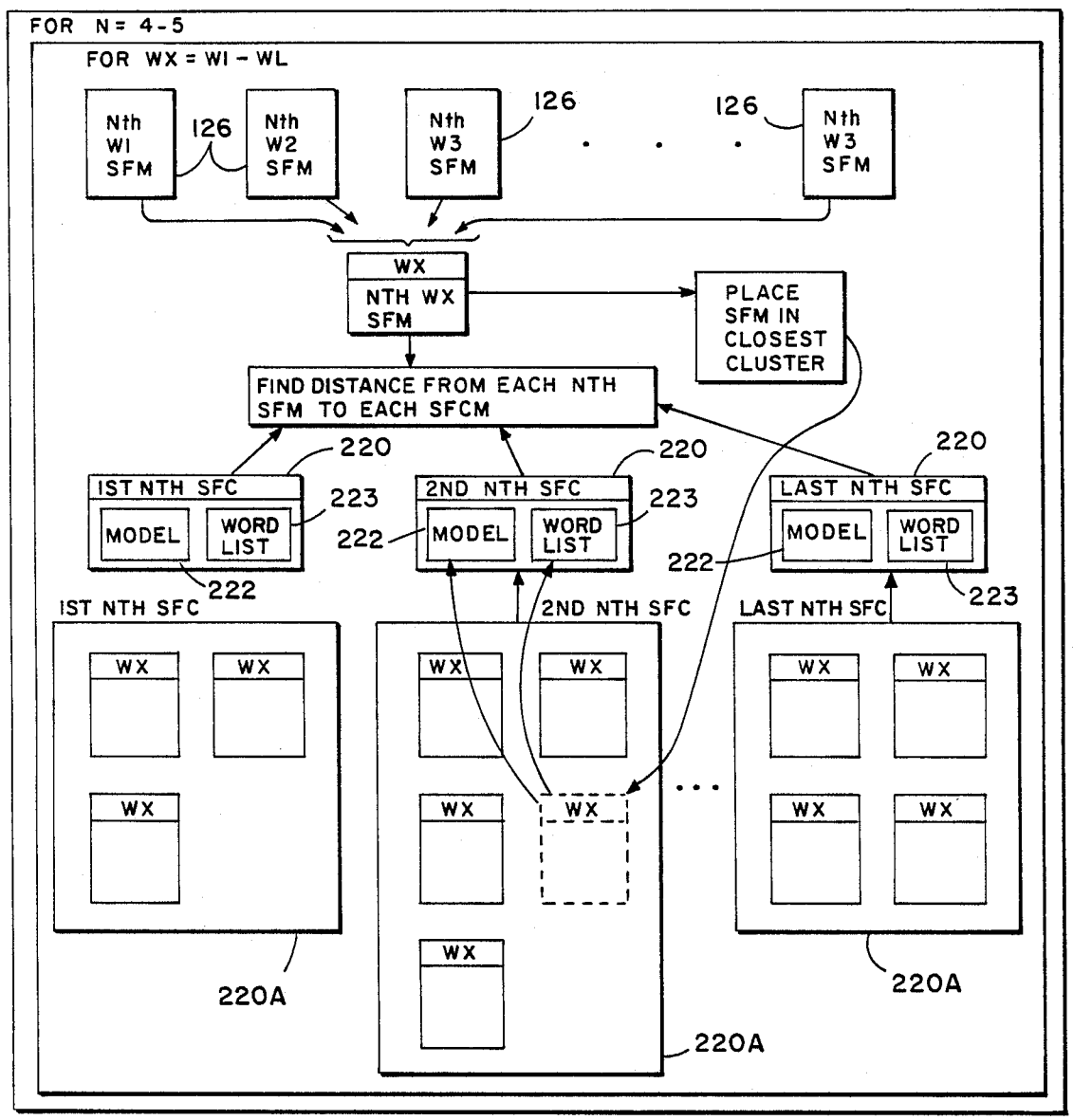
FIG. 12 is a schematic representation of a clustering process in which the fourth and fifth smoothed frame models associated with each word are clustered together to form smoothed frame cluster models.

Returning now to FIG. 1, once step 130 of that figure has been completed and all of the multiple-smoothed-frame, or MSF models, for all words in the vocabulary have been clustered into wordstart clusters, the program advances to step 200 shown in FIG. 1, which is illustrated schematically in FIG. 11. In this step a loop is performed for an index N, which varies from 1 through 3. This loop clusters the Nth smoothed frame portion 136 of all wordstart cluster models 134 and calculates an Nth wordstart-portion cluster model for each of the resulting clusters. Thus it clusters together all of the first smoothed frame portions of the wordstart cluster models, that is the first eight dimensions of the wordstart cluster model's probability distribution. Then it clusters together the second smoothed frame portion of the wordstart clusters, that corresponding to their second eight dimensions. Finally, it clusters together the third smoothed frame portion of those clusters, that corresponding to their last eight dimensions.

As the similarity between FIG. 11 and FIG. 9 indicates, the clustering process used in this step corresponds almost exactly to that used in FIG. 9, with the following exceptions: (a) the process is performed three times, once for the first, once for the second, and once for the third frame portion 136 of the wordstart cluster models 134; (b) the first, second, and third wordstart-portion cluster models 204 calculated in each of these three clustering processes only contains eight dimensions; and (c) instead of producing a word list indicating the words associated with each cluster, the process of FIG. 11 produces a wordstart cluster list 205 associated with each wordstart-portion cluster 202, indicating the wordstart clusters whose smoothed frame portion models have been placed in that wordstart-portion cluster.

Once the process of step 200 has been completed, the first frame portions 136 of each wordstart cluster model will have been grouped into a much smaller number of first wordstart-portion cluster models 204, and similarly the second and third frame portions 136 of each of the wordstart cluster models will also have been grouped into a relatively small number of wordstart-portion cluster models 204. As is explained below, this grouping of the first, second, and third frame portions into a relatively small number of first, second, and third wordstart-portion cluster models will speed the prefiltering process at recognition time by reducing the number of models against which smoothed frames derived from utterances to be recognized have to be compared.

When step 200 of FIG. 1 is completed, the program advances to step 216. This step performs a substep 218 first for all of the fourth, and then again for all of the fifth, smoothed frame models 126 calculated for all vocabulary words in step 110. Step 218, which is illustrated schematically in FIG. 12 clusters all of the fourth, and then all of the fifth, smoothed frame models 218 into a relatively small number of fourth or fifth smoothed frame clusters 220, and calculates a smoothed frame cluster model 222 for each such cluster. As is indicated by the similarly between FIG. 12 and FIG. 9 the clustering algorithm used in step 218 is substantially identical to that described with regard to FIGS. 9 and 10, except for the fact that it is performed twice, once for all the fourth smoothed frame models, and once for all fifth smoothed frame models, and except for that fact that the models which are clustered and the resulting smoothed-frame cluster models 222 are only eight dimensional probability distribution. In this clustering, when an individual smoothed frame model is placed in a smoothed frame cluster, the eight dimensions of its probability distribution are used to update the eight dimensional model of the smoothed frame cluster model associated with the cluster into which it is placed. Also, a word I.D., indicating the word from which the smoothed frame model has been derived is placed in a word list 223 associated with each such cluster.

Once the step 216 has been completed and all of the fourth and fifth smoothed frame models of each word have been clustered into a set of fourth smoothed frame clusters and a set of fifth smoothed frame clusters, respectively, the program advances to step 224. Step 224 performs a substep 226 for all the fourth, and then all of the fifth, smoothed frame clusters. As is indicated in FIG. 13, the step 226 comprises reading the word list 223 associated with each of the fourth and fifth smoothed frame clusters formed in step 216 and inserting the ID number of that smoothed frame cluster in the fourth or fifth smoothed frame cluster ID slots, 234 or 236, respectively, of a partial cluster spelling 232 associated with each word on that cluster's word lists. When step 224 is complete, each word in the vocabulary has associated with it a partial cluster spelling 232 identifying the smoothed frame clusters 220 into which its fourth and fifth smoothed frame models have been placed.

Once step 224 is finished, the program 100 shown in FIG. 1 is complete. By this time, each word is associated with a given wordstart cluster 132 by a word list 135 associated with that given cluster. Each wordstart cluster, in turn, is associated with a first, a second, and a thrid wordstart-portion cluster model 204 by the wordstart cluster lists 205 associated with each such wordstart-portion cluster model. The three wordstart-portion cluster models 204 associated with a given wordstart cluster represent the first three smoothed frame models 118 of each word associated with that wordstart cluster. In addition, each word has associated with it a partial cluster spelling 232, which contains a fourth and a fifth smoothed frame cluster ID pointing to the fourth and fifth smoothed frame cluster models which represent the fourth and fifth smoothed frame models of that word.

Thus it can be seen that the program 100 associates an implicit prefilter cluster spelling with each vocabulary word. This implicit prefilter cluster spelling consists of five eight-dimensional probability distribution cluster models, one for each of the five smoothed frame models 118 associated with a given word. The first three of these models are associated with a given word indirectly, through its corresponding worstart cluster 132, and the last two are associated with the word through its partial cluster spelling 232.

Referring now to FIG. 14 and FIG. 15, once the program 100 has created prefilter cluster model representing the first five smoothed frames of each word, these models can be used for prefiltering during the recognition of utterances. Once such models have been prepared, they can be used to perform prefiltering in a user's speech recognition system.

The program 300 shown in FIG. 14 is designed to perform prefiltering as part of a speech recognition program, such as the speech recognition program described in much greater detail in the above-mentioned U.S. patent application Ser. No. 797,249. Its function is to provide the remainder of the speech recognition program with a relatively small subset of the system vocabulary against which to perform a more detailed comparison with an utterance to be recognized. Reducing the number of vocabulary words against which such a detailed acoustic comparision is made greatly increases the speed of the recognition process.

The program 300 described with regard to FIGS. 14 and 15 starts by performing a step 302. Step 302 involves finding the anchor of the utterance to be recognized. The utterance to be recognized is received and converted into a sequence 306 of frames 104. These frames 104 are of the same type shown and described above with regard to FIG. 2. Then an anchor is found for this sequence of frames in exactly the same manner as that described above with regard to FIGS. 4 and 5. Once this anchor has been found, the program of FIG. 14 advances to step 204 in which it proceeds to calculate five smoothed frames from that utterance. This is done in the same manner, an in the same temporal relationship to the anchor frame, as that described above with regard to FIG. 4 and FIG. 5. The calculation of these five smoothed frames from the utterance to be recognized is indicated schematically at the top of FIG. 15.

Once the five smoothed frames 308 have been calculated, the program advances to step 310 which performs steps 312 and 314 for each of the first three smoothed frames 308 of the utterance to be recognized. Step 310 does this by repeating steps 312 and 314 three times, with an index N having the values one, two, and three, respectively, on successive pass. Step 312 scores the Nth smoothed frame 308 from the utterance to be recognized against each of the Nth wordstart-portion cluster models 202. This scoring is done by a calculation 318, which calculates a score corresponding to the negative logarithm of the likelihood that the Nth smoothed frame would be generated by the probability distribution of each of the Nth wordstart-portion cluster models 204. The method of calculating such likelihood scores is described in much greater detail in the above mentioned application Ser. No. 797,249. As a result of this calculation, a score 320 is associated with each Nth wordstart-portion cluster model 240, indicating the likelihood that the cluster model is associated with the given Nth smoothed frame 308.

Once the scores 320 have been calculated for each of the Nth wordstart-portion cluster models 204, step 314 of FIG. 14 causes the score 320 associated with each Nth wordstart-portion cluster to be added to a score 322 associated with each wordstart cluster 132. Since the scores made by calculation 318 shown in FIG. 15 correspond to logarithms of likelihood, when these scores are added, it corresponds to multiplying their associated likelihoods. Those skilled in the statistical arts will appreciate that multiplying likelihoods of two independent events corresponds to the likelihood of obtaining both of those two events together. In order to reduce computation, the method of FIGS. 14 and 15 makes the simplifying assumption that the generation of each smoothed frame 308 is an independent event. Although this is not strictly true, experiments have shown that this simplification does not unduly reduce the accuracy of the prefiltering process. After steps 212 and 214 have been performed for each of the first three smoothed frames 308, each wordstart cluster 132 has associated with it a score 322, representing the probability that the first three smoothed frames 308 from the utterance to be recognized correspond to the three wordstart-portion cluster models 204 associated with that wordstart cluster.

Once these scores 322 have been calculated, the program in FIG. 14 advances to step 326 which selects the best scoring wordstart clusters 132, so that only the words corresponding to those best scoring wordstart clusters will be used for further prefiltering. This process can be performed simply by comparing the scores 322 associated with each of the wordstart clusters 132 with a threshold value, and selecting only those wordstart clusters whose score are better than the threshold. It should be appreciated by those skilled in the arts, however, that other thresholding schemes can be used in this step. For example, a thresholding scheme would be used which started with the best scoring wordstart cluster and kept selecting the next lowest scoring wordstart cluster until all the words associated with selected clusters matched or exceeded a given limit.

When step 326 has been done, as is indicated by the circles surrounding selected ones of the wordstart clusters 132 in FIG. 15, the program advances to step 330, which involves performing steps 332 and 334 for each word associated with the selected best scoring wordstart clusters 132. As is described above, each of the wordstart clusters 132 has associated with a word list 135 which lists the words associated with that cluster. For each of the best scoring wordstart clusters 132 selected by step 326, each of the words 336 contained in that cluster's corresponding word list 135 are made active for further prefiltering by step 332, and the initial value of a word score 338 associated with each such active word is set equal to the score 322 of its corresponding wordstart cluster by step 334.

Once all of the words associated with the best scoring wordstart cluster have been made active in step 332 and their word scores have been set equal to their corresponding wordstart cluster scores in step 334, the program advances to step 340, which performs a step 342 once for the fourth and once for the fifth smoothed frame 308 from the utterance to be recognized. The step 342 scores the Nth (where N is first four and then five) smoothed frame 308 against each of the Nth smoothed frame cluster models 222. It does so by using a calculation 324, which is similar to the calculation 318, described above. This calculation 342 produces a score corresponding to the negative logarithm of the likelihood that the Nth smoothed frame 308 corresponds to a given Nth smoothed frame cluster models 222. It stores the score associated with each of these calculations into a score variable 344 associated with each of the Nth smoothed frame clusters 220.

Once step 340 has caused the fourth smoothed frame 308 to be compared against all of the fourth smoothed frame cluster models, and has caused the fifth smoothed frame 308 to be compared against all of the fifth smoothed frame cluster models, the program advances to step 348, which performs a step 350 for each active vocabulary word 336. This step 350 involves adding the two scores 344 associated with the word's associated fourth and fifth smoothed frame clusters to the word's prefilter score 338. This is done by causing the program to go to each word 336 and read the fourth and fifth smoothed frame cluster I.D.'s associated with that word's partial cluster spelling 232. The program then goes to those fourth and fifth smoothed frame clusters and obtains their corresponding likelihood scores 344. It then adds those scores to the word's corresponding prefilter score 338.

Since the likelihood scores 344 represent the negative logarithms of the likelihood that a given fourth or fifth smoothed frame 308 corresponds to a given fourth or fifth smoothed frame cluster model, their addition to the prefilter score 338 causes the resulting score to correspond to the likelihood of the independence occurrence of each of the first five smoothed frames 308 from the utterance to be recognized given the five probability distribution models associated with each word 336, the first three of which are associated with the word through its associated wordstart cluster 132, and the last two of which are associated with the word through its cluster spelling 332.

After step 348 of FIG. 14 has been performed, the program advances to step 360. Step 360 selects those active words 336 which have the best prefilter scores 338 to undergo a more lengthy comparison against the utterance to be recognized. Such a more lengthy comparison can be performed, for example, by using the dynamic programming described in the above-identified U.S. patent application Ser. No. 797,249. The selection of such best scoring words is indicated by the words 336 which have their corresponding prefilter scores 338 circled in FIG. 15.

An important aspect of the prefiltering method is its speed. The embodiment of the invention just described allows a large number of words to be prefiltered by comparing five smoothed frames from the utterance to be recognized against a relatively small number of acoustic probability models. The first, second, and third smoothed frames 308 need only be compared against a corresponding first, second, or third set of wordstart-portion cluster models 204, and the fourth and fifth smoothed frame 308 need only be compared against a relatively small set of fourth or fifth smoothed frame cluster models 222, respectively. Reducing the number of models against which the smoothed frames need to be compared, by representing similar sounds in different words with the same models, greatly reduces the computation required by the prefiltering. In addition, computation is reduced by representing words with similar first three smoothed frames by common wordstart clusters. This is because the use of wordstart clusters enables the scoring of all words represented by a given wordstart cluster to be performed in common for the first three smoothed frames of the utterance to be recognized.

The first preferred embodiment of the invention also greatly reduces the amount of computation required to perform prefiltering by using a linear time alignment scheme, rather than a dynamic time alignment scheme, to match the succession of smoothed frames from the utterance to be recognized against the succession of models associated with each wordstart cluster and each word's partial cluster spelling. In this embodiment of the invention, the linear time alignment used is one which causes the first smoothed frame cluster to be compared against a first set of cluster models, the second smoothed frame from the utternace to be compared against a second set of acoustic cluster models, and so forth, until the fifth smoothed frame is compared against a fifth set of acoustic cluster models. It should be understood that in other embodiments of the invention other forms of linear time alignment could be used, such as affine linear time alignment schemes, which make multiple comparisons of the succession of descriptions from the utterance to be recognized against the succession of models associated with words, linearly stretching or linearly shifting the time alignment of either the succession of descriptions or the succession of models each time a comparison is made. Such linear time alignment methods, even those making such multiple time alignments, usually require much less computation then dynamic programming methods which use non-linear time alignment, and thus which require that many more comparisons be made.

In the first embodiment of the invention, just described, the user of the recognition system does all of the speaking necessary to develop the prefilter models used by that system. This provides good performance, because all the prefiltering models are derived only from the user's voice. But the requirement that each user speak each vocabulary word multiple times is a major inconvenience. If, for example, a system had ten thousand vocabulary words and required a user to say each word five times, it would require the user to say fifty thousand utterances before he could use the system. This would greatly discourage use of the present invention.

For this reason a second preferred embodiment of the invention is provided which enables a person to enroll, or become a user, of the system more rapidly. This second preferred embodiment is basically the same as the first, except that it derives its implicit prefilter cluster spellings by having multiple speakers say each vocabulary word, and thus it only requires an end user to speak enough words to train the clusters out of which those implicit cluster spellings are made. Once this training is done, recognition is run in the same manner as is described above with regard to FIGS. 14 and 15.

Figure 16:
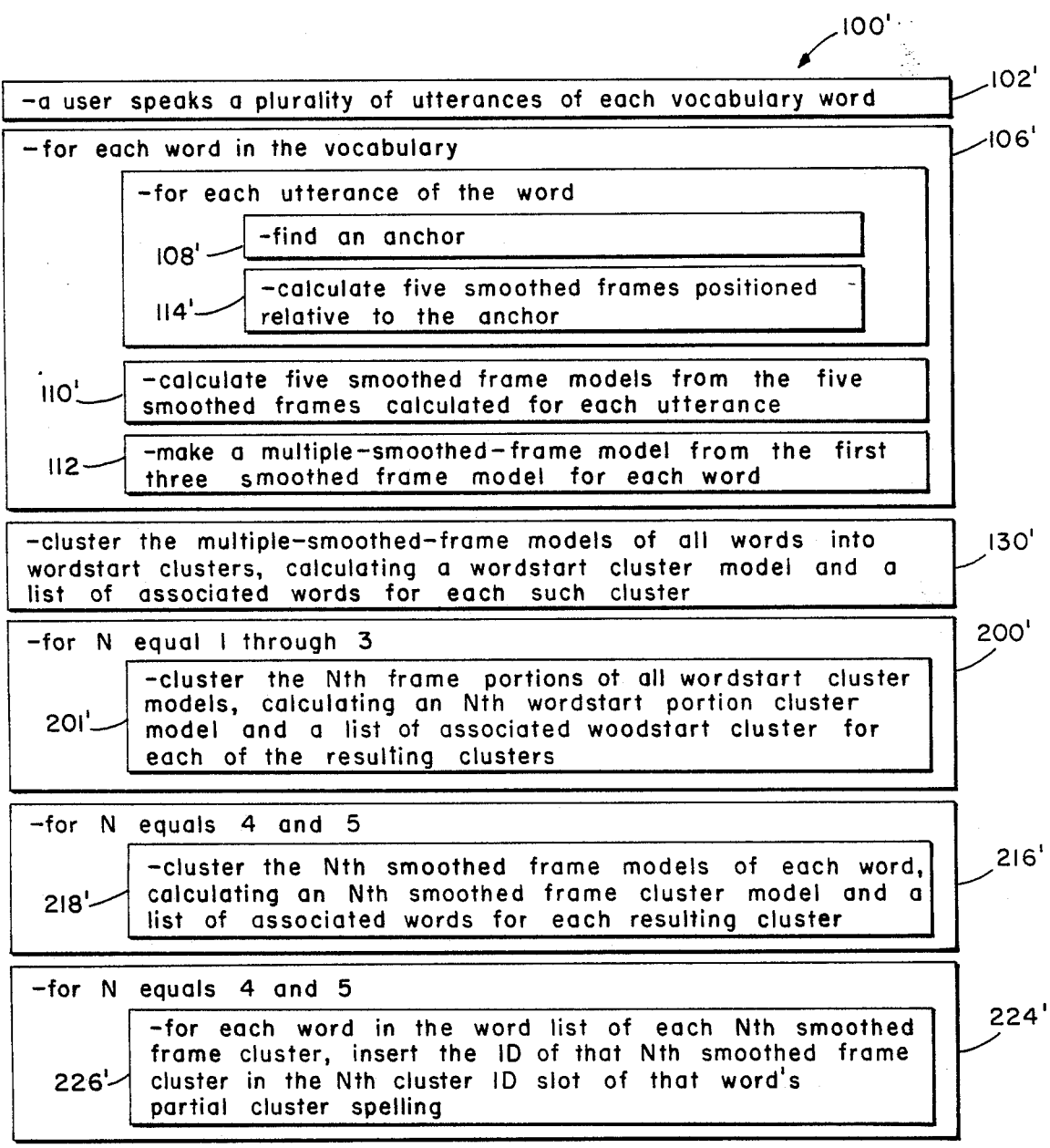
FIG. 16 is a schematic block diagram of the functional steps required to produce multi-speaker prefiltering models according to a second preferred embodiment of the invention.

This second, or quick enrollment, embodiment of the invention uses a training method 100′, shown in FIG. 16. This method is the same as the method 100 described with regard to FIG. 1, except that it uses multiple speakers and multiple speaker models. To highlight this similarity all of the steps in method 100′ have the same number as their corresponding step in method 100 followed by a prime mark. Step 102′ of method 100 is the same as step 102 of method 100, except that it has a plurality of speakers each speak multiple utterances of each word in the vocabulary. Preferably ten to twenty speakers should be used, and each should say five or more utterances of each word. It is preferred to have multiple speakers say multiple utterances of each word in step 102′ so that the prefilter models created by the program 100′ will be general in nature, and thus will work well for a broad population of speakers.

Figure 17:
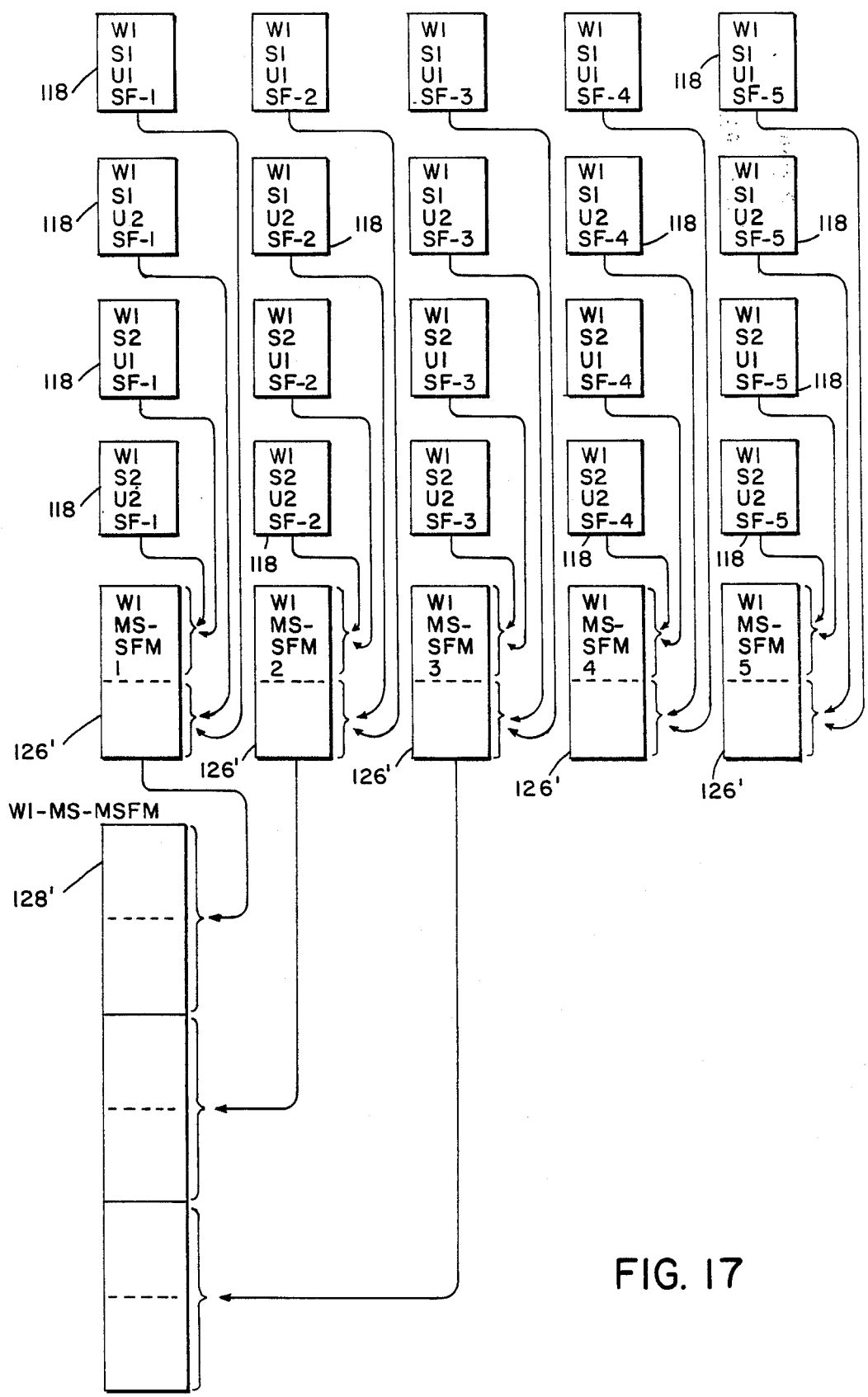
FIG. 17 is a schematic representation of how the smoothed frames calculated for different utterances of a given word by different speakers are combined to form until multi-speaker smoothed frame models, are how a group of these smoothed frame models are combined to form multi-speaker multiple-smoothed-frame models.

Once step 102′ has been performed, the program advances to step 106′. This step includes sub-steps 108′, 110′, and 112′. Step 108′ finds an anchor and then five smoothed frames for each utterance of each word, in the same manner as step 108 of FIG. 1. Step 110′ is similar to step 110 described above, except it forms multi-speaker smoothed frame models 126′ for each word. A multi-speaker smoothed frame model 126′ differs from a smoothed frame model 126 of the type shown in FIG. 6 because its probability distribution has a separate eight dimensions for each speaker whose smoothed frames 118 are combined to form it. This is illustrated schematically in FIG. 17 which shows smoothed frames from two utterances U1 and U2 of a first speaker S1 being combined into a first part, representing eight dimensions, of multi-speaker smoothed frame models 126', and smoothed frames from two utterances U1 and U2 of a second speaker S2 being combined into a second part of those models. Of course it is preferred that more than two speakers be used. If, for example, ten speakers are used to say each word six times, step 110' combines the six correspondingly numbered smoothed frames SF-X, where x varies from one to five, to form an eight dimensional probability distribution representing how that speaker says the Xth numbered smoothed frame of the utterance. The eight dimensional distributions produced for each of the ten speakers for the Xth smoothed frame are then concatenated to form an Xth multi-speaker smoothed frame model for the word with display dimensions. This is repeated with X having values one through five, so that five multi-speaker models are created.

All of the remaining steps of method 100' are identical to the steps of methods 100, except that the models and clusters of the method 100' have a separate set of dimensions for each of the speakers used to develop the prefiltering models. For example, if method 100' uses ten speakers, when step 112' concatenates the first three multi-speaker smoothed frame models 126', the resultant multi-speaker multiple-smoothed-frame models 128' has two hundred and forty dimensions, which is ten times the number of dimensions which the multiple-smoothed-frame model 128 had in the single speaker embodiment described above. Since the models 128' each have two hundred and forty dimensions, the multi-speaker wordstart clusters models produced from them in step 130' also each have two hundred and forty-dimensions. In this case each of the Nth frame portions of the multi-speaker wordstart clusters has eighty dimensions, as do each of the multi-speaker wordstart portion cluster models calcualted in step 201' and each of the multi-speaker smoothed frame models calculated in step 218'.

The clustering together of probability distribution containing separate sets of dimensions for each of a plurality of speakers groups together those sounds which are most similar over the plurality of speakers, causing the resulting cluster spellings for each vocabulary word to be generalized in nature. The process used to cluster multi-speaker models is the same as that described above with regard to FIG. 10, except that the number of dimensions of the models being clustered is different.

Once the method 100' is completed, a multi-speaker prefilter cluster spelling is provided for each vocabulary word. These cluster spellings are similar to the cluster spellings produced by the method 100 described above and are ready for use in the prefiltering process of FIGS. 14 and 15, except that the wordstart portion clusters and the smoothed frame clusters of which they are spelled are all based on multi-speaker acoustic models. These multi-speaker wordstart portion clusters and smoothed frame clusters have too many dimension to be scored against smoothed frames 308 produced by an end user during recognition. Although mathematical techniques could be used to combine these multi-speaker models into eight dimensions, the resulting models would not be as accurate when used on a given end user as models derived from the given end user himself. Of course, more accurate cluster spellings could be produced by requiring each user to say each vocabulary word multiple times, but the effort required is usually not worth the extra effort. However, the incrase in performance obtained by having the end user train up the models for each wordstart portion cluster and each smoothed frame cluster is worth the relatively small amount of time that it requires.

Figure 18:
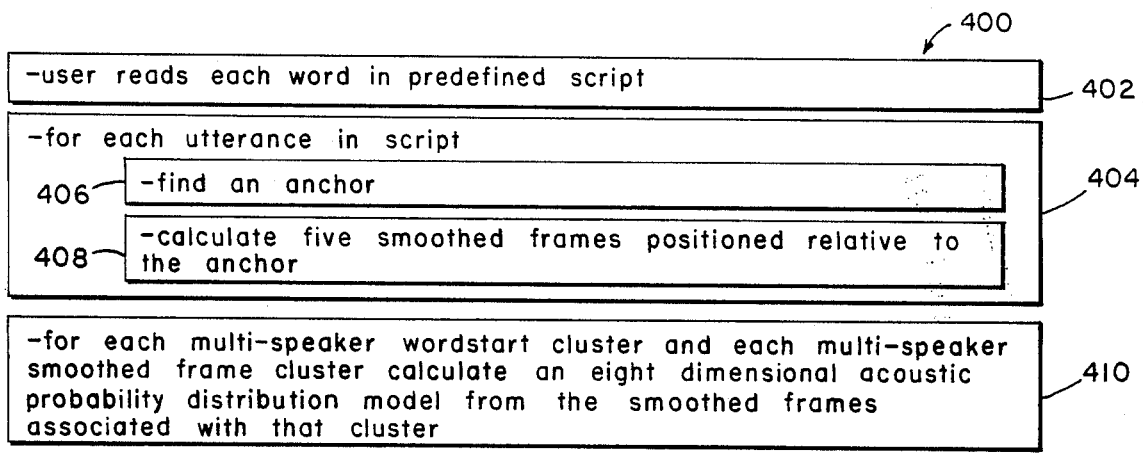
FIG. 18 is a schematic block diagram of the functional steps required to train user-dependent acoustic model for the multi-speaker cluster spellings derived in the steps illustrated in FIG. 16.

The process 400 of training up these cluster models is described in FIG. 18. This process starts with step 402, in which the user reads each word in a predefined script. Preferably the system includes a program which displays each word as it is to be read, so the user needs only to read the words into a microphone. If this quick enrollment embodiment of the present invention is used with a method of training up models for use in the more lengthy comparison used in speech recognition, such as the method of training up recognition models of the type disclosed in the above mentioned U.S. patent application Ser. No. 862,275, the same script can be used to train up both prefiltering cluster models and cluster models to be used in the main recognition of a speech system.

Once all of the script words have been read by the end user in step 402, the program advances to step 404 in which it finds an anchor in sub-step 406 and then calculates five smoothed frames positioned relative to that anchor in sub-step 408 for each utterance in the script. This is done in the same manner described above with regard to steps 114 and 116 of FIG. 1.

Once five smoothed frames have been calculated for each script utterance, step 410 calculates an eight dimensional acoustic model for each multi-speaker wordstart portion cluster and each multi-speaker smoothed frame portion produced by the method 100' of FIG. 16. This is done for each cluster by combining all the eight dimensional smoothed frames from the script utterances which are associated with that cluster, and using standard statistical techniques to calculate a mu and sigma to represent the mean and average deviation of each of the corresponding eight dimensions of those smoothed frames.

Preferably the program which executes step 410 is provided in advance with a mapping between each of the five smoothed frames of each script utterance and a corresponding wordstart portion cluster or smoothed frame cluster. Such a mapping is provided by the cluster spelling of each script word. The last two clusters of this spelling, that is its corresponding 4th and 5th smoothed frame cluster, can be easily determined by referring to that word's partial cluster spelling 232. Step 100' associates the first three clusters of a word's cluster spelling, that is its associated 1st, 2nd, and 3rd wordstart portion clusters, with that word indirectly. The following steps can be used to explicitly identify which wordstart portion clusters are associated with each word. First, for each Nth wordstart portion cluster, add that Nth wordstart portion cluster to a cluster spelling associated with each wordstart cluster on its wordstart cluster list 205. After this has been performed for all wordstart portion clusters from N equals one through N equals three, each wordstart cluster will have a spelling of three wordstart portion clusters associated with it. Second, once such a cluster spelling has been calculated for each wordstart cluster, the three wordstart portion clusters of each such spelling are associated with each word on the word list 135 of its associated wordstart cluster. Once this has been done for each wordstart cluster, each word will have a first, a second, and a third wordstart portion cluster explicitly identified for it, in addition to the 4th and 5th smoothed frame cluster identified for it by its partial cluster spelling 232.

The resulting complete and explicit prefilter model cluster spelling can be used to create a mapping of smoothed frames generated by the speaking of script words into corresponding wordstart portion clusters and smoothed frame clusters. These explicit prefilter cluster spellings can also be used to select the training script. The script should be selected so that its cluster spelling has at least five occurrences of each wordstart portoin cluster and each smoothed frame cluster. Such a script should not take more than 15 minutes to say.

Once step 410 of FIG. 18 has calculated an eight dimensional probability distribution model for each multi-speaker wordstart portion cluster and each multi-speaker smoothed frame cluster, the multi-speaker wordstart portion clusters are used in the actual prefiltering process of FIGS. 14 and 15 in the same manner as are the single speaker workstart portion clusters 202, and the multi-speaker smoothed frame clusters are used in that process in the same manner as are the single speaker smoothed frame clusters 220, and that process is executed in exactly the same manner as is described above.

Referring now to FIGS. 19-22, another embodiment of the invention will be described which includes a new prefiltering method. In this embodiment the new prefiltering method is used in conjunction with the prefiltering method described above with regard to FIGS. 16-18. To distinguish this new method from the prefiltering method described above, the new method is referred to as the "time independent histogram prefiltering method", or the "histogram method" for short. The prefiltering method described above is referred to as the "linear time alignment" prefiltering method, or the "time alignment method" for short. The new method is called the time independent histogram prefiltering method because it is based on probability scores which are calculated from a count of the number of times that each of a plurality of acoustic clusters is associated with the frames of the training utterances of each word, independent of the order, or time, in which those frames occur relative to each other. The previously described method is called the linear time alignment prefiltering method, because, unlike the histogram method, its comparison process aligns each successive smoothed frame of the utterance to be recognized against successive acoustic models. Thus, unlike the histogram method, the time alignment method is very sensitive to the order and rate at which sounds occur in the utterance to be recognized.

Figure 19:
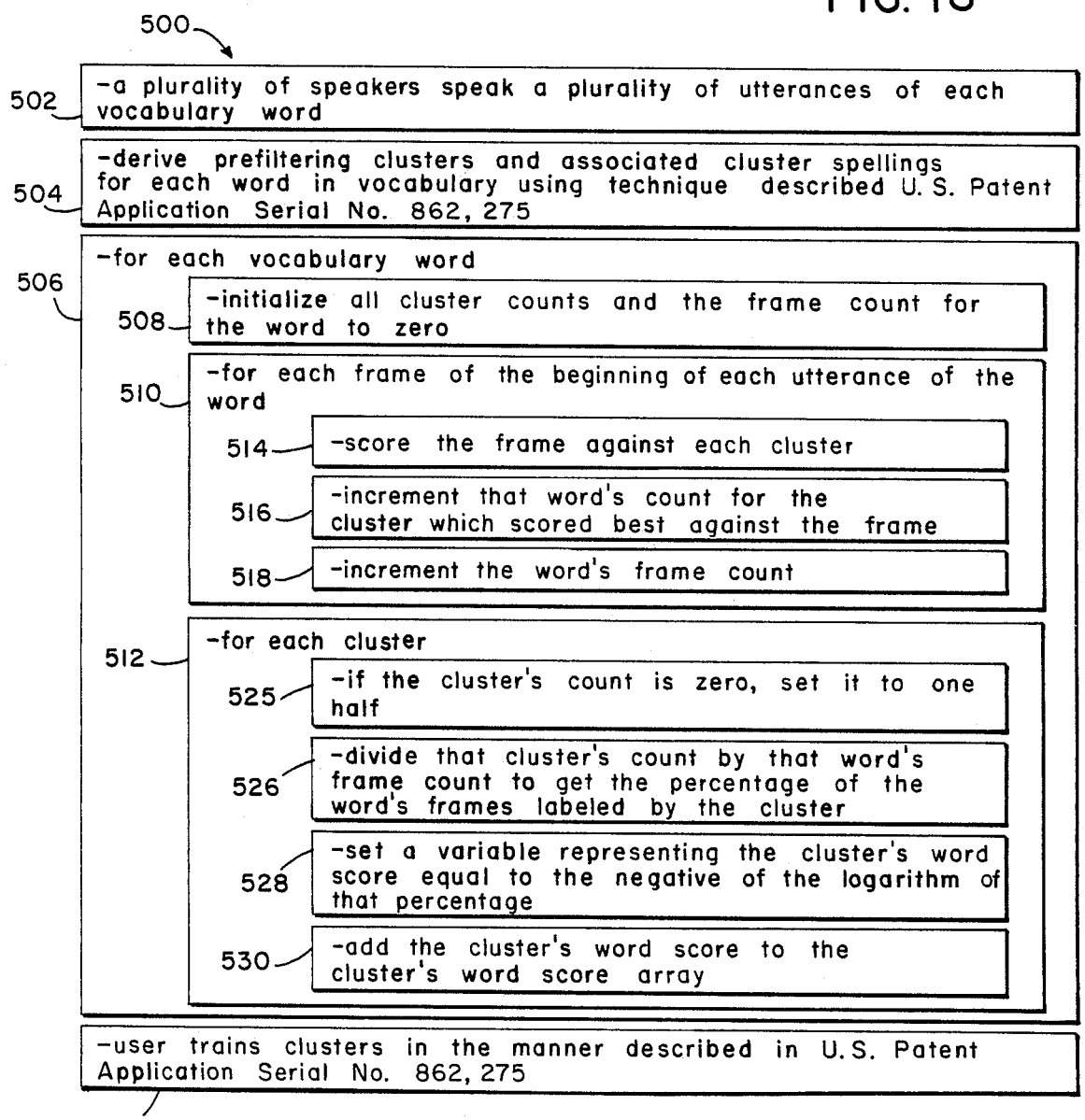
FIG. 19 is a schematic block diagram of the functional steps required to derive prefilter models according to a third embodiment of the present invention.

FIG. 19 discloses a method 500 for making the prefilter models which are used in the histogram prefiltering method. The first step of this method, the step 502, comprises having a plurality of speakers say a plurality of training utterances of each vocabulary word. This is the same as step 102' of FIG. 16, and in the preferred embodiment of the histogram method, in which it is used in conjunction with the multi-speaker time alignment prefiltering method described above, the same utterances of the vocabulary words used for step 102' are also used for step 502. But if utterances are being used to train models for the histogram method as well as the time alignment method, a greater number of such utterances should be said for each word. This is because it takes a large number of utterance of each word to accurately determine the probility that each given cluster will be associated with that word, as is required for the histogram method. This is particularly true for the cluster which are occasionally, but not usually, associated with a word.

Once a plurality of utterances have been obtained for each vocabulary word, step 504 derives multi-speaker cluster models and multi-speaker cluster spellings from those utterances. It does so by using the process described in the above mentioned U.S. patent application Ser. No. 862,275, which is incorporated herein by reference. Roughly speaking, that process uses dynamic programming to divide the different utterances of a given vocabulary word into corresponding groups of frames. The frames in corresponding groups from different utterances of the same word are used to calculate a multi-speaker node model, which is an eight dimensional probability distribution having a mu and sigma for each of the eight parameters of the frames from which it is calculated. This is done for each of the sets of corresponding groups of frames associated with the utterances of each word. The resulting sequence of node models created for each word provides a multi-speaker acoustic model for that word.

Dynamic programming is then used to time align each node in a given word model against each utterance of its corresponding word. Then all the frames in all the utterances of the word by a given speaker which are time aligned against a given node are combined to calculate an eight dimensional probability distribution model for how that given speaker says that given node. This is done for each node of each word for each speaker. The separate models of how each speaker says a given node are concatenated to form parallel node models for that node,which has a separate eight dimensions for each such speaker. Then the resulting parallel nodes from all vocabulary words are clustered, using a clustering algorithm similar to that described above. This clustering groups together similar sounds from different words.

Once these clusters have been obtained, a multi-speaker cluster spelling is derived for each word. This is done by replacing each node of a word's word model with the ID of the cluster into which that node's corresponding parallel node was placed. Once these clusters spellings have been produced, an eight dimensional multi-speaker cluster model is derived for each cluster. This is done by associating with each cluster ID in the cluster spelling of each word, the eight dimensions of the multi-speaker cluster associated with a given speaker. This produces a speaker dependent acoustic model of the word which corresponds to that word's cluster spelling. Dynamic programming is then used to time align this model against each utterance of the word by that speaker. This is done for each speaker for each word. Then the eight dimensional probability distribution is calculated for each cluster from all the frames, over all speakers and over all words in which the cluster occurs, which are time aligned with that cluster. It is these eight dimensional multi-speaker models and the multi-speaker cluster spellings of each word which are produced by step 504 of FIG. 19 of the present application.

Preferably the clustering threshold used in the clustering of step 504 is made large enough so that approximately only forty multi-speaker clusters are formed by the clustering process of that step. It is preferred that such a small number of clusters be used both to reduce the number of comparisons required to perform the histogram prefiltering, which increases speed, and to make it easier to obtain sufficient statistical data on the likelihood of each cluster being associated with the frames of each vocabulary word.

Once step 504 is completed, the method 500 advances to step 506, which performs a sequence of steps 508, 510, and 512 for each word in the vocabulary. Step 508 initializes the cluster counts and the frame count for the word to zero. The cluster count for each cluster represents the number of frames from the training utterances of that words which are associated with that cluster by step 510, described below. The frame count for the current word represents the total number of frames in all training utterances of the word which are associated with any cluster by the step 510.

Once this initialization is done, the program advances to step 510. This step performs a loop for each frame in an initial portion of each training utterance of the current word. More specifically, the loop is performed for twice as many individual frames 104 of each training utterance as are used to calculate the five smoothed frames 118 for that utterance in the above described time alignment method, starting with the first individual frame 104 used to calculate those smoothed frames. Step 510 develops prefiltering models based on these initial portions of each training utterance because during actual prefiltering, the step 602, described below, only compares clusters against the individual frames 104 that are used to calculate the smoothed frames 308 described with regard to FIGS 14 and 15. Step 602 does this so that the results of the histogram prefiltering will be complete at about the same time as the results from the time alignment prefiltering. This enables the results of these two methods to be combined, as is explained below, to select which words warrant further computation, long before the utterances of most words to be recognized are complete. Since step 604 only scores individual frames from the initial part of each utterance to be recognized which are used to generate smoothed frames, it is best that the histograms used to generate those scores be based only on the similar part of each vocabulary word. Since the utterance to be recognized might be spoken up to approximately twice as fast as the training utterances of its corresponding word, step 510 calculates histograms for twice as long a period as is required to calculate the five smoothed frames in the training utterances.

It should be understood that in other embodiments of the histogram prefiltering method of the present invention, the loops of steps 510 and 604 need not be so limited. For example, they could be performed for each frame of their corresponding utterances.

Figure 20:
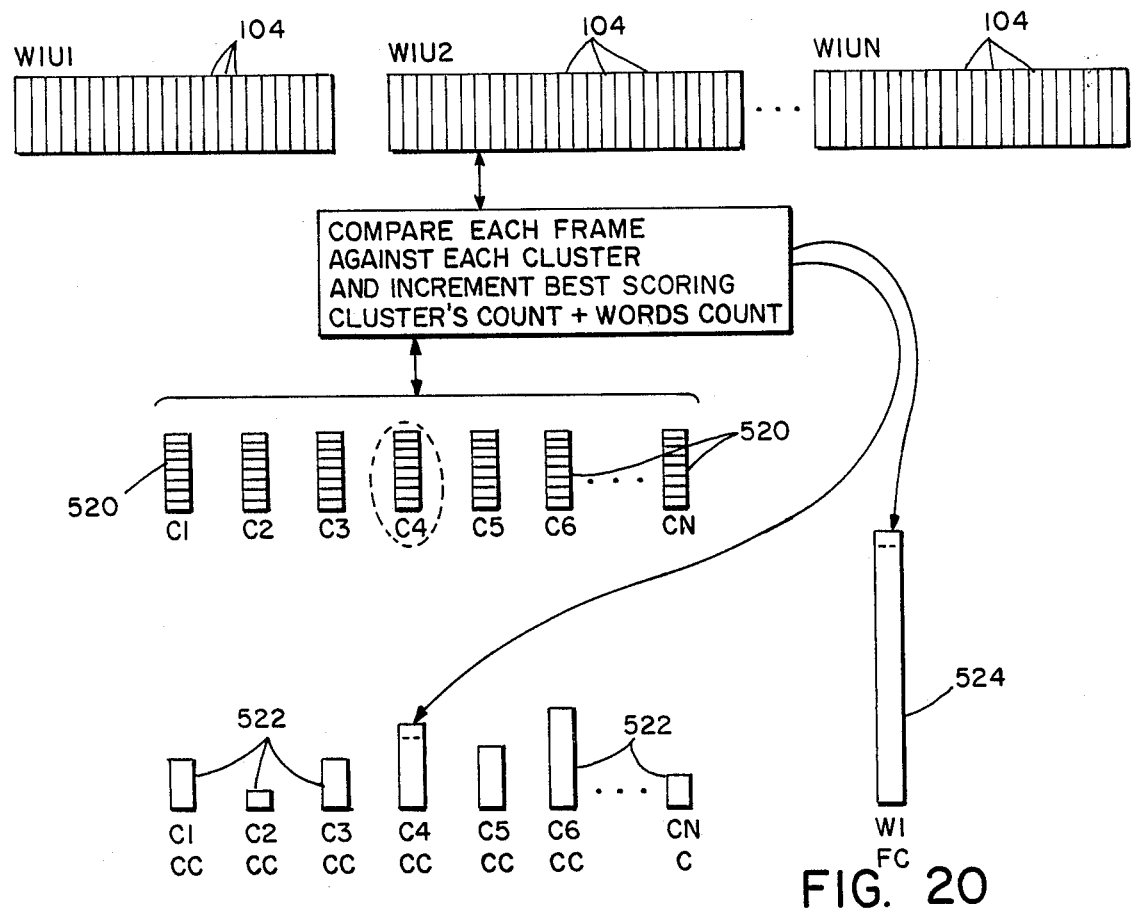
FIG. 20 is a schematic representation of some of the steps shown in FIG. 19.

The loop of step 510 comprises three sub-steps, steps 514, 516, and 518 which are performed for each frame upon which that loop operates. The functions performed by these three steps are represented in a highly schematic manner in FIG. 20. Step 514 scores the current frame 104 from a training utterance against each of the approximately forty multi-speaker cluster model 520 derived in step 504. This scoring calculation is similar to that performed in steps 312 and 342 described above in FIG. 14. Once the current frame has been scored against each of the multi-speaker cluster models 520, step 516 find which of the cluster models 520 had the best match with that frame and it increments the cluster count 522 of that best scoring cluster. In FIG. 20, it is assumed that cluster C4 is the best scoring cluster against the current frame, and thus cluster four's cluster count, C4CC, is incremented. It can be seen that all of the cluster counts for a given word, when taken together, form a histogram of the number of times that each of the forty clusters is associated with a frame from the initial portion of one of that word's training utterances. Once the best scoring cluster's cluster count is incremented, step 518 increments the current word's frame count. In FIG. 20 the frame count of word one, labeled W1FC, is shown being incremented.

After step 510 has been performed for each frame in the initial portion of the training utterances of a given word, step 512 performed a loop for each of the approximately forty clusters. This loop includes four sub-steps, steps 525, 526, 528, and 530.

Step 525 sets the count of the current cluster for the current word to one half if that count is currently equal to zero. This is done because a cluster count are used to calculate indications of the probability that a given frame from the initial portion of a given word will be associated with a given cluster. In the formula that is used, a zero cluster count would indicate a zero probabilty that its corresponding cluster would ever label a frame from the initial portion of its corresponding word. This would indicate that there was no chance the utterance to be recognized corresponded to that word any time the histogram prefiltering associated a single frame from that utterance with the zero probability cluster. Because of their very strong effect, such zero cluster counts are to be avoided in the absence of the very large amount of statistical data which would be required to justify them. Replacing such zero cluster counts with counts of one half, is an ad hoc approach, which accords that cluster a lower probability than if the cluster's count had been one, but a sufficiently high count to prevent the system from rejecting a word because of one single frame.

Step 526 divides the current cluster's count for the current word by that word's frame count. This produces a number which is equal to the percent of the frames in initial portions of all training utterances of the word which are associated with the given clusters. This percentage represents the probability that the given cluster is associated with any given frame produced by the speaking of the initial portion of the current word. Once this percentage has been calculated for the current cluster, step 528 sets the cluster's word score for the current word equal to the negative of the logarithm of this percentage. The cluster's word score is set equal to the negative logarithm of this percentage, so that, in effect, such percentages can be multiplied by adding the logarithms which represent them. The negatives of such logarithms are used because the percentages have values betwee one and zero, and thus their logarithms would normally have a negative value. Using the negatives of such negative values produces positive values, which are a little easier to deal with.

Once the cluster's word score has been calculated, step 530 stores that score at a location associated with the current word in an array of such word scores associated with the current cluster. By the time step 506 is completed, step 530 is performed for each cluster of each word. As a result, step 530 provides the word score array of each cluster with a word score for each vocabulary word.

Once the steps 502, 504, and 506 and have been completed, each of the vocabulary words has a multi-speaker cluster spelling and each of the approximately forty clusters used in those spellings has a multi-speaker cluster model and a word score array. None of the steps 502, 504, and 506 requires any input from an end user of the speech recognition system, and thus they can all be performed by the manufacturer of such a system. However, to improve the performance of such system it is desirable that the end user replace the eight dimensional multi-speaker cluster models calculated for each cluster in step 504 with an eight dimensional acoustic cluster models based on the way that he speaks. This is performed in step 532 of FIG. 19. Preferably this step uses software that prompts the user to speak a relatively brief training script and then derives user-dependent cluster model from the resulting utterances using this process for deriving such user-dependent cluster models described in the above mentioned U.S. patent application Ser. No. 862,275. Roughly speaking, this process derives an acoustic model for each word in the training script by associating with each cluster ID in that word's multi-speaker cluster spelling the associated multi-speaker cluster model. Then it uses dynamic programming to time align the acoustic model for each such training word with the end user's utterance of it. This is done for each word in the training script. Then all of the frames in all training words which have been time aligned against the multi-speaker model of a given cluster ID are used to calculate the user-dependent probability distribution model for that cluster ID.

The preferred embodiment of the histogram prefiltering method is used in conjunction with the rapid enrollment embodiment of the time alignment prefiltering method described above. Thus the same training script used to train up the time alignment prefiltering models is preferably also used to train up the user-dependent cluster models used in the histogram prefiltering method.

Figure 21:
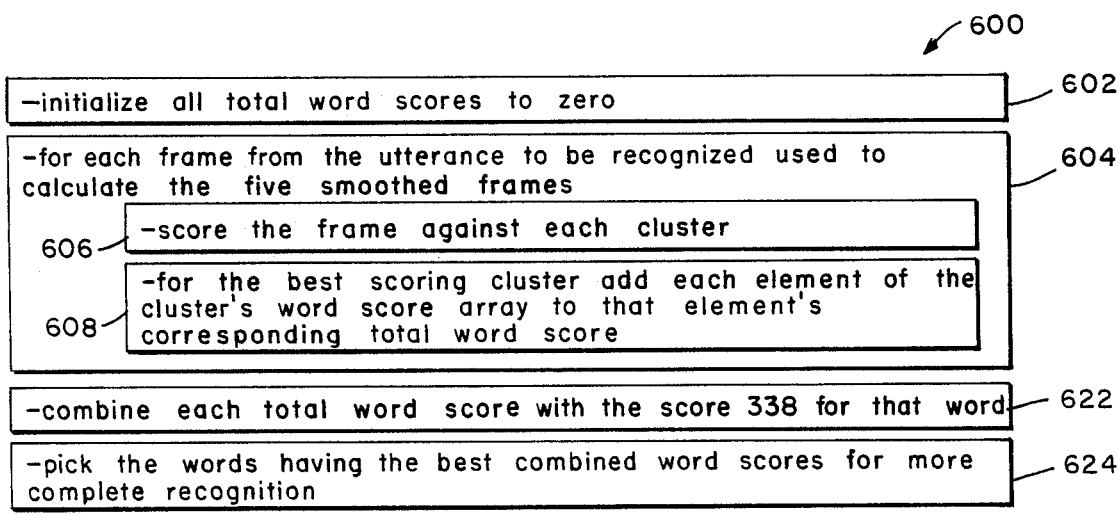
FIG. 21 is a schematic block diagram of the functional steps required to perform prefiltering using the prefilter models developed in the steps of FIG. 19.
Figure 22:
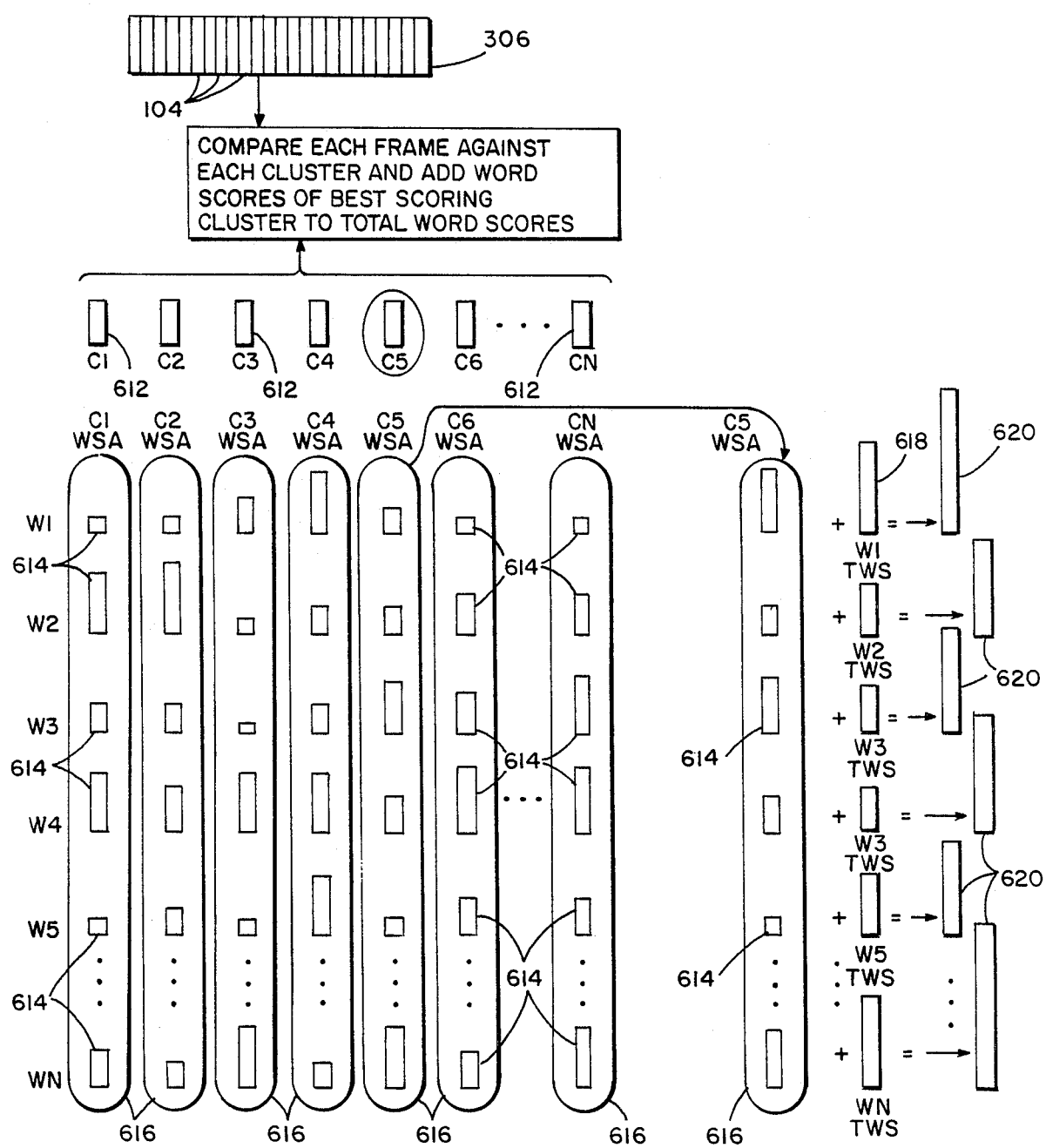
FIG. 22 is a schematic representation of some of the steps shown in FIG. 21.

Once method 500 have been completed, the histogram prefiltering models are complete and the system is ready to run histogram prefiltering according to the method 600 shown in FIGS. 21 and 22. The method 600 starts with a step 602, which initializes all total word scores to zero. Each total word score is used to provide a rough indication of how likely it is that its associated word corresponds to an utterance to be recognized 306.

Once the total word scores have been initialized, step 604 performs a loop for each individual frame 104 of the utterance to be recognized which used to calculate the smoothed frames 308 shown in FIG. 15. As is described above, the loop is only performed upon these individual frame 104 so that the results of the histogram prefiltering will be available for combination with the results of the time alignment prefiltering as soon as the initial part of the utterance to be recognized has been spoken.

The loop 604 contains two steps 606 and 608, which are repeated for each frame upon which it operates. Step 606 scores the current frame against each of the user-dependent cluster models 612, as is indicated schematically in FIG. 22. Step 608 then adds each word score 614 of the best scoring cluster's word score array 616 to its corresponding current total word score 618, to produce a new total word score 620 for each such word. In FIG, 22 the fifth cluster, that labeled C5, is indicated as the best scoring cluster against the current frame. As a result, cluster five's word score array, C5WSA, has its elements added to the current total word scores. As is stated above, the word scores in each cluster's word score array are actually negatives of the logarithms of the probability that a given frame in the initial part of their associated word will score best against a their associated cluster. Adding these logarithmic word scores corresponds to multiplying their associated probabilities.

Once step 604 is completed, the total word score 620 associated with each vocabulary word equals the sum of all word scores associated with that word in all the word score arrays of the clusters selected as scoring best against each of the frames upon which the loop of step 604 is performed. This total word score provides a rough indication of the probability that its associated word corresponds to the utterance to be detected.

After step 604 is complete, method 600 advances to step 622. Step 622 produces a combined score for each word by combining its total word score 620 produced by the histogram prefiltering method just described and its score 338 produced by the time alignment prefiltering method described above with regard to FIGS. 14 and 15. Since both the scores 620 and the scores 338 are negative logarithms of probabilities, they can be added to each other to produce a combined probability score.

Once the total word score 620 and the score 338 for each word have been combined, step 624 of FIG. 21, selects the words with the best, or lowest, combined score. These best scoring words are selected for a more complete comparison against the utterance to be detected.

The histogram prefiltering method just described provides only a rough estimate of the likelihood that each vocabulary word corresponds to the utterance to be recognized, but it has several strong advantages. First, it is very fast. All it requires for each frame to be processed is the scoring of that frame against approximately forty clusters and then the addition of that cluster's word score array against the total word scores, which can also be represented as an array. Since that addition of two arrays can be performed relatively quickly, the entire prefiltering process is very quick. Secondly, the histogram prefiltering method is totally independent of how fast the speaker says a utterance to be recognized. The embodiments of the time alignment prefiltering method described above uses simple linear time alignment. As a result, they do not work well if the speaker significantly varies the spread at which he speaks. Since scores of the histogram method are basically independent of how fast the speaker talks, the histogram method compliments the method of FIGS. 14 and 15, and tends to make the correct word a candidate even if the utterance to be recognized is spoken at an unusual speed.

It should be appreciated that the basic concepts of the histogram prefiltering method just described can be used independently of the time alignment method describe in FIGS. 14 and 15. For example, the histogram prefiltering method can be used independently of any other prefiltering methods, as a speech recognition system's only prefiltering method. In this case words would be selected for further computation based solely on the total word scores which the histogram method produces. It should also be understood that the histogram prefiltering method can also be used in conjunction with other prefiltering methods besides the time alignment prefiltering method described above.

Their are many different possible embodiments of the histogram prefiltering method of the present invention. We shall call one such alternate embodiment the distributed-count histogram method. In this method the step 516 shown in FIG. 19 is replaced with a step in which the current word's count for each cluster i is incremented by an amount corresponding to $P(C_i|x)$, the probability of the sound represented by cluster i occurring given the current observed frame x. This probability $P(C_i|x)$ can be calculated from the likelihood scores which the step 514 of FIG. 19 makes for each of n clusters. The likelihood score calculated in step 514 for a given cluster k represents the probability $P(x|C_k)$, that is, the probability of the observed frame occurring given the probability distribution of the cluster k. As those skilled in Bayesian analysis will appreciate, the probability $P(C_i|x)$ can be calculated from the probabilities represented by the likelihood scores using the following formula:

$$P(C_i|x) = \frac{P(C_i)P(x|C_i)}{P(C_1)P(x|C_1) + P(C_2)P(x|C_2) + \ldots + P(C_n)P(x|C_n)}$$

where $P(C_k)$ is the apriori probability of the cluster k occurring; and where n is the total number of clusters used in the histogram method. This calculation is made for each of the histogram's clusters by varying the index i from one to n, and the resulting score corresponding to $P(C_i|x)$ for each such calculation is added to its corresponding cluster count. Incrementing all n of a word's cluster counts in this manner causes the resulting histogram produced for each word to more accurately reflect the probability of each cluster being associated with the frame of a given word on a smaller amount of training data. This is the major advantage of the distributed-count histogram method.

Another method for decreasing the number of training utterances required to properly train histograms is what we shall call the fine-cluster histogram method. The fine-cluster histogram method is designed for use with a speech recognition system such as that described in the above mentioned U.S. patent application Ser. No. 862,275, which uses clusters in the main recognition phase of a speech recognition system. In order to distinguish the clusters used in the main recognition phase from those used in the histogram prefiltering method described above, the clusters used in the main recognition phase are referred to as fine clusters, and the clusters used in the histogram prefiltering phase are referred to as crude clusters. This is appropriate since usually several hundred to several thousand fine clusters are used in the main recognition phase, as compared to the approximately forty crude cluters recommended for use in the histogram prefiltering phase. As a result, the fine clusters are capable of representing much finer distinctions between sounds than the crude clusters.

According to the fine-cluster histogram method, crude clusters are calculated in the same manner as in the basic histogram method described above. But after the fine cluster spelling of each word has been determined, and after the frames of an end user's training words have been associated with such clusters by dynamic programming, all according to the procedure set forth in application Ser. No. 862,275, a histogram is calculated for each fine cluster. This is done in a manner analogous to that described above in which word histograms are calculated. For each fine cluster, a determination is made of which crude cluster matches most closely to each of the frames associated with that fine cluster in all of the training utterances of words whose cluster spellings contain that five cluster. For each such match, the count of the matching crude cluster is incremented in the fine cluster's histogram. Once histograms have been calculated for each fine cluster, a histogram is developed for each word. This is done, for each word, for adding together the histograms of each fine cluster, multiplied by the percentage of frames in the word's training utterances which are associated with that fine cluster by the procedures of the above mentioned patent application Ser. No. 797,249.

The resulting histogram for each word tends to provide a relatively good indication of the probability that each frame from an utterance of the word will correspond to each of the crude clusters. This is because such histograms draw on statistical information about which crude clusters are associated with which sounds from the utterances of many different words. In fact, such a histogram draws information from each training utterance of each word in the entire system vocabulary which contains any of the fine clusters associated with its associated word. The histogram produced by this fine-cluster histogram method for each word is preferably combined with a histogram for that word calculated in the manner describe above with regard to FIGS. 19–22. This allows information from training utterances of the specific word for which the histogram is being calculated to be given extra weight, while at the same time taking advantage of the large statistical samplings associated with the fine cluster histograms. It should also be understood that the basic concept of the distributed count histogram method can be used in calculating fine-cluster histograms.

It should also be appreciated that other embodiments of the histogram method can be used which calculate each word's histogram or each word's prefiltering score by selecting, for example, every other or every third frame of training utterances or of utterances to be recognized. Although this decreases the amount of information the system has from which to calculate its histograms or its word scores, it reduces the amount of computation required for prefiltering, and thus speeds that prefiltering up. Similarly, the basic concept of the histogram prefiltering method could calculate its histograms and prefilter scores based on smoothed frames of the type described above.

As is stated above, the time alignment and histogram prefiltering methods are used together in the preferred embodiment because they are complementary. The time alignment method produces a score which takes into account the order in which sounds are said, which is good, but the described embodiment of this method does not produce very accurate scores if the speed at which a word to be recognized is said differs greatly from the speed at which the method's models for that word were trained. On the other hand, the described embodiment of the histogram method does not take any account of the order in which word sounds are said, which is a disadvantage, but the accuracy of its scores are not adversely affected if the word to be recognized is spoken at a different rate than that at which its histogram models are trained, which is a definite advantage. Combining the two methods increases the chance that the correct word receives a high enough score to be selected by the prefiltering process for a more detailed acoustic match against the utterance to be recognized. Thus the combination improves the overall accuracy of speech recognition systems with which it is used.

Thus it can be seen that the basic idea of using two separate methods to calculate two separate scores for each word in a currently active vocabulary and combining these scores has the advantage of producing a combined score which is less subject to the weaknesses of each of the two separate scoring methods. Of course more than two such separate scores can be combined in this manner. The calculation of a plurality of separate scores for each word of a currently active vocabulary is particularly useful in speech recognition systems which have a plurality of word-selecting phases, each of which selects a sub-set of words from the currently active vocabulary, and makes that sub-set into the new currently active vocabulary. For example, in the preferred embodiment described above the combination of the time alignment and the histogram prefiltering methods is used in the prefiltering phase of a speech recognition system. After this prefiltering phase is performed, it is intended that a more computationally intensive word-selection phase be performed on the active vocabulary selected by that prefiltering phase. For example, the dynamic programming process described in detail in the above mentioned U.S. patent application Ser. No. 797,249 can be used as such a more intensive word-selectoin phase. In other embodiments, the basic idea of using separate methods to calculate separate scores for each word in a currently active vocabulary could be used in another word-selecting phase of a multi-phase recognition process, such as in a post-processing phase. Such a post-processing phase takes a relatively small active vocabulary selected by the more computationally intensive main recognition phase, and run detailed tests on those words.

The calculation of multiple scores for each word of an active vocabulary is most attractive in the less computationally intensive word-selecting phases of a speech recognition system, such as the prefiltering or post-processing phase. For example, even if the calculation of two separate scores for each word in the prefiltering phase doubles the amount of computation required in that phase, the total increase in the computation required by the whole speech recognition method will not normally be significantly increased. This is because prefiltering normally accounts for a relatively small amount of compututation compared to a main word-selection phase, such as that described in the above mentioned application Ser. No. 797,249, which uses dynamic programming. Therefore, even if the use of two prefiltering methods increases the overall performance of a speech recognition system by a relatively small percentage, it is often justified, because the overall increase in the system's computation is often increased by an even smaller percentage.

For best results, the prefilteirng scores derived by all of the methods described above should be combined with a language score before they are actually used for selecting which words warrant further comparison against the utterance to be detected. Language scores are scores which indicate the probability of each word appearing at a given point in a sequence words based on the language context created by one or more near by words. A more detailed description of language scores and of a method for combining them with prefiltering scores to select which vocabulary words warrant further computation is contained in the above mentioned U.S. patent application Ser. No. 797,249.

It can be seen that new improved methods for making and using models for use in speech recognition, and particularly in the prefiltering step of speech recognition, have been described above. When used for prefiltering, the methods of the present invention have significant advantages compared to many prefiltering methods of the prior art. In particular, the present invention enables a larger number of words to be prefiltered with a given amount of computation than, for example, the prefiltering method described in the above mentioned U.S. patent application Ser. No. 797,249. The present invention also enables prefilter models for a large number of words to be stored more efficiently than prefiltering methods which require an independent representation of the initial sounds of each word.

The preferred embodiment of the invention described above are all used for the prefiltering of vocabulary words. It should be understood, however, that certain aspects of the present invention are not limited to use inprefileirng, and can, for example, be used in the performance of a more lengthy speech recognition comparison, once prefiltering has been performed.

In the description above, the frames from which smoothed frames and cluster models are calcualted each include eight, basically spectral, parameters. It should be understood that in other embodiments of the invention a different number of spectral parameters, or parameters other than spectral parameters, can be used. For example, frames comprised of linear predictive coding parameters can be used with the present invention instead of frames of spectral parameters.

In the description above of the time alignment prefiltering method, the first three smoothed frames of words are represented by wordstart clusters. It should be appreciated that in alternate embodiments such wordstart clusters could represent more or less than three smoothed frames, or that other types of cluster models could be used to represent words which have similar sequences of sounds.

Accordingly, the present invention should not be considered to be limited by the description herein of the preferred embodiments, but rather should be interpreted in accordance with the following claims.

What we claim is:

1. A prefiltering method for use in a speech recognition system, said method comprising:
   receiving an acoustic description of an utterance to be recognized;
   storing a vocabulary of words;
   storing a plurality of probabilistic acoustic cluster models and using individual ones of said acoustic cluster models to represent at least a part of more than one vocabulary word;
   comparing at least a portion of said acoustic description from said utterance against each of said cluster models, and producing a cluster likelihood score for each cluster model against which such a comparison is made;
   using the cluster likelihood score produced for each cluster model to calculate a prefilter score for words represented by that cluster model; and
   selecting a subset of said vocabulary words to undergo a more lengthy comparison against said utterance to be recognized based on the prefilter scores associated with said vocabulary words;
   wherein:
   said acoustic description of said utterance to be recognized includes a succession of acoustic descriptions representing a sequence of sounds associated with said utterance;
   said cluster models each comprises a succession of probabilistic acoustic models, for modeling a sequence of sounds associated with each word represented by said cluster model;

said comparing includes comparing a succession of said acoustic descriptions from the utterance to be recognized against the succession of acoustic models from each of a plurality of cluster models and producing a cluster likelihood score for each such cluster model as a result of that comparison; and said cluster models are wordstart cluster models, that is, models which only represent the initial portion of many words in said vocabulary.

2. A prefiltering method as described in claim 1 wherein:

said acoustic description of the utterance to be recognized includes, in addition to said succession of acoustic descriptions which are compared against the succession of acoustic models of said wordstart cluster models, one or more additional acoustic descriptions which represent a portion of the utterance occurring after that represented by said succession of acoustic descriptions;

said method includes storing additional acoustic description cluster models, which represent sounds occurring in vocabulary words after the sounds represented by wordstart cluster models;

said using of the cluster likelihood scores to produce prefilter scores includes using the cluster likelihood score produced for each wordstart cluster model to produce an intial prefilter score for words represented by that wordstart cluster model;

said method further includes the following extra prefilter scoring steps for each of a plurality of vocabulary words:

comparing one or more of said additional acoustic descriptions from the utterance to be recognized against one or more additional acoustic description cluster models representing sounds of that word, and producing an additional score as a result of that comparison;

combining said additional score for a word with its initial prefilter score to produce a combined prefilter score for that word; and said selecting of said subset of vocabulary words to undergo more lengthy comparison is based on the combined prefilter scores associated with the vocabulary words.

3. A prefilter method as described in claim 2 further including pruning those vocabulary words represented by the wordstart cluster models having the worst cluster likelihood scores from further consideration, including preventing them from having said exta prefilter scoring steps performed for them.

4. A prefiltering method for use in a speech recognition system, said method comprising:

receiving an acoustic description of an utterance to be recognized;

storing a vocabulary of words;

storing a plurality of probabilistic acoustic cluster models and using individual ones of said acoustic cluster models to represent at least a part of more than one vocabulary word;

comparing at least a portion of said acoustic description from said utterance against each of said cluster models, and producing a cluster likelihood score for each cluster model against which such a comparison is made;

using the cluster likelihood score produced for each cluster model to calculate a prefilter score for words represented by that cluster model; and selecting a subset of said vocabulary words to undergo a more lengthy comparison against said utterance to be recognized based on the prefilter scores associated with said vocabulary words;

wherein:

said acoustic description of said utterance to be recognized includes a succession of acoustic descriptions representing a sequence of sounds associated with said utterance;

said cluster models each comprises a succession of probabilistic acoustic models, for modeling a sequence of sounds associated with each word represented by said cluster model;

said comparing includes comparing a succession of said acoustic descriptions from the utterance to be recognized against the succession of acoustic models from each of a plurality of cluster models and producing a cluster likelihood score for each such cluster model as a result of that comparison; and said comparing includes using linear time alignment to compare successive descriptions from said utterance against corresponding successive models of said cluster models.

5. A prefiltering method for use in a speech recognition system, said method comprising:

receiving an acoustic description of an utterance to be recognized;

storing a vocabulary of words;

storing a plurality of probabilistic acoustic cluster models and using individual ones of said acoustic cluster models to represent at least a part of more than one vocabulary word;

comparing at least a portion of said acoustic description from said utterance against each of said cluster models, and producing a cluster likelihood score for each cluster model against which such a comparison is made;

using the cluster likelihood produced for each cluster model to calculate a prefilter score for words represented by that cluster model; and selecting a subset of said vocabulary words to undergo a more lengthy comparison against said utterance to be recognized based on the prefilter scores associated with said vocabulary words;

wherein:

said receiving of an acoustic description of said utterance to be recognized includes receiving a sequence of individual frames, each describing said utterance during a brier period of time, and said comparing includes deriving a series of smoothed frames from said sequence of individual frames, each of said smoothed frames being derived from a weighted average of a plurality of individual frames, and comparing at least one of said smoothed frame against said cluster models.

6. A speech recognition method comprising:

receiving an acoustic description of an utterance to be recognized, including a succession of acoustic descriptions representing a sequence of sounds associated with the utterance;

storing a vocabulary of words;

storing a plurality of sound-sequence models and using individual ones of said sound-sequence models to represent at least a part of more than one word, each of said models comprising a succession of probabilistic acoustic models modeling a sequence of sounds associated with each word represented by said sound-sequence model;

using linear time alignment to compare a succession of acoustic descriptions from said utterance to be recognized against the succession of acoustic models from each of a plurality of sound-sequence models, and for producing a sound-sequence score for each such sound-sequence model as a result of its comparison;

using the sound-sequence score produced for a given sound-sequence model as a result of its comparison to calculate a word score for each of a plurality of words associated with that sound-sequence model.

7. A speech recognition method as described in claim 6 wherein said sound-sequence models are wordstart models, that is, models which only represent the initial portion of many words in said vocabulary.

8. A speech recognition method as described in claim 7, wherein:

said acoustic description of the utterance to be recognized includes, in addition to said succession of acoustic descriptions which are compared against the succession of acoustic models of said wordstart models, one or more additional acoustic descriptions which represent a portion of the utterance occurring after that represented by said succession of acoustic descriptions;

said method includes storing additional acoustic description models, which represent sounds occurring in vocabulary words after the sounds represented by wordstart models;

said using of sound-sequence scores to calculate word scores includes using the sound-sequence score produced for an individual wordstart model to produce an initial word score for words represented by that wordstart model;

said method further includes the following extra scoring steps for each of a plurality of vocabulary words:

comparing one or more of said additional acoustic descriptions from the utterance to be recognized against one or more additional acoustic description models representing sounds of that word, and producing an additional word score as a result of that comparison;

combining said additional word score for a word with its initial word score to produce a combined word score for that word.

9. A method of making models to represent sounds of vocabulary words for use in speech recognition, said method comprising:

deriving an acoustic description of each of a plurality of vocabulary words, each acoustic description comprising a succession of acoustic descriptions representing a sequence of sounds associated with its corresponding word;

clustering the acoustic descriptions of said vocabulary words to derive a plurality of probabilistic multi-word cluster models, each comprising a succession of acoustic models derived from the corresponding succession of acoustic descriptions of the words whose descriptions have been grouped in that model's cluster wherein said clustering to derive said multi-word cluster models includes:

clustering said acoustic descriptions of vocabulary words to derive a plurality of probabilistic multi-word clusters, each having a multi-word cluster model formed of a succesion of cluster portions which represent successive temporal portions of the common sound sequence represented by the multi-word cluster model;

clustering the cluster portions from a plurality of multi-word cluster models to derive a plurality of cluster-portion cluster models; and forming a record of which multi-word clusters have had their cluster portions placed in which cluster-portion cluster models.

10. A method of making models to represent sounds of vocabulary words for use in speech recognition, said method comprising:

deriving an acoustic description of each of a plurality of vocabulary words, each acoustic description comprising a succession of acoustic descriptions representing a sequence of sounds associated with its corresponding word;

clustering the acoustic descriptions of said vocabulary words to derive a plurality of probabilistic multi-word cluster models, each comprising a succession of acoustic models derived from the corresponding succession of acoustic descriptions of the words whose descriptions have been grouped in that model's cluster;

wherein:

said acoustic descriptions used in said clustering describe only the initial portion of some words in said vocabulary; and thus said multi-word cluster models are wordstart models, that is, models which represent only the initial portions of some words in said vocabulary.

11. A method of making models for use in speech recognition as described in claim 10 further including:

deriving one or more additional acoustic descriptions of each of said plurality of vocabulary words, each additional acoustic description representing a sound occurring in its associated word after the sounds represented by that word's wordstart model;

clustering the additional acoustic descriptions associated with a plurality of words to form additional acoustic description cluster models;

associating with a given vocabulary word the wordstart model into which its acoustic description has been clustered; and associating with that given vocabulary word the one or more additional acoustic description cluster models into which that word's one or more additional acoustic descriptions have been clustered.

12. A speech recognition method comprising:

receiving a succession of acoustic descriptions, each of which describes one of a succession of sounds from an utterance to be recognized;

storing a plurality of acoustic models;

storing in association with each such model a separate word score for each of a plurality of vocabulary words, which score indicates the probability that its associated word corresponds to the utterance to be recognized given that the score's associated acoustic model is found to match an acoustic description from that utterance;

matching one of said acoustic models with each of said acoustic descriptions based on the relative closeness of said models with said descriptions;

calculating a total word score for each of said vocabulary words by combining the word scores for that word associated with each of the acoustic models which matches one of said acoustic descriptions; and using the total word score produced for each vocabulary word to determine which of said vocabulary words most probably corresponds to the utterance to be recognized;

wherein said word score stored in association with each of the acoustic models for each of said vocabulary words indicates the probability that its word corresponds to the utterance to be recognized given that the word's model is found to match an acoustic description from that utterance, independent of the time within the succession of acoustic descriptions that the matching acoustic description occurs.

13. A speech recognition method comprising:

receiving a succession of acoustic descriptions, each of which describes one of a succession of sounds from an utterance to be recognized;

storing a plurality of acoustic models;

storing in association which each such model a separate word score for each of a plurality of vocabulary words, which score indicates the probability that its associated word corresponds to the utterance to be recognized given that the score's associated acoustic model is found to match an acoustic description from that utterance;

matching one of said acoustic models with each of said acoustic descriptions based on the relative closeness of said models with said descriptions;

calculating a total word score for each of said vocabulary words by combining the word scores for that word associated with each of the acoustic models which matches one of said acoustic descriptions; and using the total word score produced for each vocabulary word to determine which of said vocabulary words most probably corresponds to the utterance to be recognized; in which:

the word score for each vocabulary word stored in association with each acoustic model corresponds to a logarithm of the probability of that word corresponding to the utterance to be recognized given that its model is found to match an acoustic description from that utterance; and said calculating of a total word score for each vocabulary word includes adding the word scores associated with that word from each of the selected acoustic models.

14. A speech recognition method as described in claim 13 in which:

all of the separate word scores associated with each acoustic model are stored in an array;

all of the total word scores for each vocabulary word are stored in a corresponding array; and said calculating of said total word scores includes adding the elements of the word score array associated with each acoustic model found to match an acoustic description from the utterance to be recognized with the corresponding element of the total word score array to derive an updated total word score array.

15. A speech recognition method comprising:

receiving a succession of acoustic descriptions, each of which describes one of a succession of sounds from an utterance to be recognized;

storing a plurality of acoustic models;

storing in association with each such model a separate word score for each of a plurality of vocabulary words, which score indicates the probability that its associated word corresponds to the utterance to be recognized given that the score's associated acoustic model is found to match an acoustic description from that utterance;

matching one of said acoustic models with each of said acoustic descriptions based on the relative closeness of said models with said descriptions;

calculating a total word score for each of said vocabulary words by combining the word scores for that word associated with each of the acoustic models which matches one of said acoustic descriptions; and using the total word score produced for each vocabulary words by combining the word scores for that word associated with each of the acoustic models which mathces one of said acoustic descriptions; and said using the total word score produced for each vocabulary word to determine which of said vocabulary words most probably correspoinds to the utterance to be recognized; in which:

saids using of said total word scores to determine which of said vocabulary words most probably corresponds to the utterance to be recognized includes using said total word socres to select which sub-set of said vocabulary words appear to warrant more extensive comparison against that utterance; and performing such a more extensive comparison of the words of that sub-set against said utterance to determine which words in that sub-set most probably correspond to said utterance.

16. A speech recognition method comprising:

using a first method to calculate a first score for each of a plurality of vocabulary words based at least in part on descriptions of successive sounds from an utterance to be recognized, said scores indicating the probability that each vocabulary word corresponds to said utterance;

using a second method to calculate a second score for each said vocabulary words baed at least in part on descriptions of the same successive sounds from said utterance, said second scores also indicating the probability that each vocabulary word corresponds to the utterance to be recognized;

combining said first and second scores for each of said vocabulary words to produce a combined score for that word;

using the combined score produced for each vocabulary word to determine which of said vocabulary words most probably corresponds to the utterance to be recognized;

wherein:

said first method calculates the first score for each vocabulary word by using a particular time alignment between the description of said successive sounds and a succession of acoustic models associated with that word and calculates a scores based on that particular time alignment; and said second method calculates the second score for each vocabulary word by comparing descriptions of said successive sounds against a plurality of acoustic models without using the particular time alignments used for each word by said first method.

17. A speech recognition method comprising:
using a first method to calculate a first score for each of a plurality of vocabulary words based at least in part on descriptions of successive sounds from an utterance to be recognized, said scores indicating the probability that each vocabulary word corresponds to said utterance;
using a second method to calculate a second score for each said vocabulary words based at least in part on descriptions of the same successive sounds from said utterance, said second scores also indicating the probability that each vocabulary word corresponds to the utternace to be recognized;
combining said first and second scores for each of said vocabulary words to produce a combined score for that word;
using the combined score produced for each vocabulary word to determine which of said vocabulary words most probably corresponds to the utterance to be recognized;
wherein:
said first method calculates the first score for each vocabulary word by comparing descriptions of said successive portions of said utterance against a succession of acoustic models associated with that word in a manner which makes the score associated with that word depend upon the order in which the sounds of those successive portions of the utterance are said; and
said second method calculates the second score for each vocabulary word by comparing descriptions of said successive sounds against a plurality of acoustic models in a manner which makes the score assocated with the word independent of the order in which those successive sounds are said.

18. A speech recognition method as described in claim 17 wherein said first method uses linear time alignment to compare descriptions of said successive portions of said utterance against the succession of acoustic models associated with each vocabulary word.

19. A speech recognition method comprising:
using a first method to calculate a first score for each of a plurality of vocabulary words based at least in part on descriptions of successive sounds from an utterance to be recognized, said scores indicating the probability that each vocabulary word corresponds to said utterance;
using a second method to calculate a second score for each of said vocabulary words based at least in part on descriptions of the same successive sounds from said utterance; said second scores also indicating the probability that each vocabulary word corresponds to the utterance to be recognized;
combining said first and second scores for each of said vocabulary words to produce a combined score for that word;
using the combined score produced for each vocabulary word to determine which of said vocabulary words most probably corresponds to the utterance to be recognized; wherein:
the method starts with an initial currently active vocabulary comprising a plurality of vocabulary words;
the method comprises a succession of word-selecting phase, each of which selects a sub-set of words from the currently active vocabulary, and makes that sub-set into the new currently active vocabulary;
one of said word-selecting phases comprises the using of said first and second methods to calculate first and second scores for each vocabulary word in the currently active vocabulary and then using the combined scores produced for each currently active vocabulary word to select said sub-set of that currently active vocabulary as the new currently active vocabulary.

20. A speech recognition method as described in claim 19 wherein said word-selecting phase which uses said first and second method comprises less than half of the computation required by all word-selecting phases to recognize a given utterance.

21. A speech recognition method comprising:
storing a plurality of acoustic models, each of which represents a sound which occurs as part of one or more speech units;
finding a plurality of matches between acoustic models and successive portions of speech to be recognized;
in response to each such match, associating with a given period of the speech an evidence score for each of the one or more speech units; and
combining the one or more evidence scores for a given speech unit which are associated with a given region of the speech as a result of a plurality of such matches, to determine the probability that the given speech unit corresponds to that region of speech, with this combination being performed independently of the order in which the region scores are associated with the region of speech;
wherein each speech unit is a vocabulary word which the system is capable of recognizing.

22. A speech recognition method as described in claim 21, in which the combining of evidence scores is performed separately for each of a plurality of speech units to derive prefilter scores which are used to select which words receive a more detailed comparison against the speech to be recognized.

23. A speech recognition method comprising:
storing a plurality of acoustic models, each of which represents a sound which occurs as part of one or more speech units;
finding a plurality of matches between acoustic models and successive portions of speech to be recognized;
in response to each such match, associating with a given period of the speech an evidence score for each of the or more speech units; and
combining the one or more evidence scores for a given speech unit which are associated with a given region of the speech as a result of a plurality of such matches, to determine the probability that the given speech unit corresponds to that region of speech, with this combination being performed independently of the order in which the evidence scores are associated with the region of speech;
wherein:
the speech to be recognized is represented as a sequence of acoustic frames;
individual frames from the speech to be recognized are compared against a plurality of acoustic models to determine which frames match which acoustic models; and the speech-unit-score information provided for a given speech unit and a given acoustic model is a value which indicates the probability that an individual acoustic frame taken randomly from a given portion of an utterance of the given speech unit will match the given acoustic model.

24. A speech recognition method comprising:

storing a plurality of acoustic models, each of which represents a sound which occurs as part of one or more speech units;

finding a plurality of matches between acoustic models and successive portions of speech to be recognized;

in response to each such match, associating with a given period of the speech an evidence score for each of the one or more speech units; and combining the one or more evidence scores for a given speech unit which are associated with a given region of the speech as a result of a plurality of such matches, to determine the probability that the given speech unit corresponds to that region of speech, with this combination being performed independently of the order in which the evidence scores are associated with the region of speech;

in which the combining of evidence scores for each of a plurality of speech units is used to derive prefilter scores which are used to select which speech units receive a more detailed comparison against the speech to be recognized.

* * * * *